(12) United States Patent
Musgrove

(10) Patent No.: US 8,840,127 B2
(45) Date of Patent: Sep. 23, 2014

(54) SPIRAL CONE PULLEY RECIPROCAL PEDAL DRIVE SYSTEM AND METHODS

(76) Inventor: Robert Musgrove, Franklin, TN (US)

( * ) Notice: Subject to any disclaimer, the term of this patent is extended or adjusted under 35 U.S.C. 154(b) by 137 days.

(21) Appl. No.: 13/343,676

(22) Filed: Jan. 4, 2012

(65) Prior Publication Data

US 2013/0168942 A1    Jul. 4, 2013

(51) Int. Cl.
     *B62M 1/02*     (2006.01)
     *F16H 55/00*    (2006.01)

(52) U.S. Cl.
     USPC ............ 280/261; 74/37; 280/253; 280/259; 474/152; 474/164

(58) Field of Classification Search
     USPC ......... 280/210, 232, 233, 243, 244, 250, 252, 280/259, 261, 253; 74/37; 474/152–164
     See application file for complete search history.

(56) References Cited

U.S. PATENT DOCUMENTS

| | | | |
|---|---|---|---|
| 453,712 A | 6/1891 | Nier | |
| 478,156 A | 7/1892 | Dunn | |
| 587,837 A | 8/1897 | Latimer | |
| 588,698 A | 8/1897 | Eickershoff | |
| 594,417 A | 11/1897 | McGowan | |
| 2,023,889 A | 12/1935 | Kramps | |
| 2,286,154 A | 6/1942 | Norred | |
| 2,630,333 A | 3/1953 | Petersen | |
| 3,834,733 A | 9/1974 | Harris | |
| 3,891,235 A | 6/1975 | Shelly | |
| 4,169,609 A | 10/1979 | Zampedro | |
| 4,227,712 A | 10/1980 | Dick | |
| 4,574,649 A | 3/1986 | Seol | |
| 4,608,034 A * | 8/1986 | Reswick | ......... 474/49 |
| 4,630,839 A | 12/1986 | Seol | |
| 4,645,475 A * | 2/1987 | Husted | ......... 474/56 |
| 4,744,577 A * | 5/1988 | Brent et al. | ......... 280/215 |
| 4,913,684 A * | 4/1990 | Mantovaara et al. | ......... 474/12 |
| 5,121,654 A | 6/1992 | Fasce | |
| 5,199,929 A * | 4/1993 | Stites | ......... 474/54 |

(Continued)

FOREIGN PATENT DOCUMENTS

| | | |
|---|---|---|
| FR | 2419209 | 5/1979 |
| GB | 2104462 | 3/1983 |

(Continued)

OTHER PUBLICATIONS

International Search Report from International Searching Authority, dated Apr. 26, 2013, 10 pages.

*Primary Examiner* — Joseph M Rocca
*Assistant Examiner* — Marc A Scharich
(74) *Attorney, Agent, or Firm* — Waddey Patterson; Matthew C. Cox

(57) ABSTRACT

A pedal drive system for a bicycle includes a front spiral cone pulley and a rear pulley. The front spiral cone pulley is attached to a crank arm, and the rear pulley is attached to a rear wheel on a bicycle in some embodiments. A power cable, or tension linkage, extends between the front spiral cone pulley and the rear pulley. The front spiral cone pulley is angularly moveable relative to the first crank arm such that the radial position of the point of engagement between the power cable and the front spiral cone pulley may be selectively manipulated for controlling the gear ratio between the front spiral cone pulley and the rear pulley. In some embodiments, the rear pulley is also a spiral cone pulley.

12 Claims, 22 Drawing Sheets

(56) References Cited

U.S. PATENT DOCUMENTS

| | | |
|---|---|---|
| 5,254,042 A | 10/1993 | Chung-Suk |
| 5,280,936 A | 1/1994 | Schmidlin |
| 5,335,927 A | 8/1994 | Islas |
| 5,368,321 A | 11/1994 | Berman et al. |
| 5,419,572 A | 5/1995 | Stiller et al. |
| 5,688,199 A * | 11/1997 | Spirig .............. 474/49 |
| 5,785,337 A | 7/1998 | Ming |
| 5,871,221 A | 2/1999 | Min et al. |
| 5,876,053 A | 3/1999 | Ray |
| 5,957,794 A * | 9/1999 | Kerr .............. 474/111 |
| 6,007,083 A | 12/1999 | Currie |
| 6,113,510 A | 9/2000 | Farmos |
| 6,123,636 A | 9/2000 | Farmos |
| 6,129,646 A | 10/2000 | Farmos |
| 6,412,802 B1 | 7/2002 | Kugel et al. |
| 6,432,009 B1 * | 8/2002 | Hansen et al. .............. 474/49 |
| 6,554,309 B2 | 4/2003 | Thir |
| 6,723,029 B2 | 4/2004 | Salgado |
| 7,011,376 B2 | 3/2006 | Sepulveda |
| 7,600,771 B2 | 10/2009 | Miller et al. |
| 7,753,387 B2 | 7/2010 | Wei |
| 2005/0098977 A1 | 5/2005 | Paquette |
| 2005/0253355 A1 | 11/2005 | Nacer |
| 2007/0228687 A1 | 10/2007 | Parker |
| 2009/0066053 A1 | 3/2009 | Yan |
| 2010/0089193 A1 | 4/2010 | Martin |
| 2010/0096826 A1 | 4/2010 | Baek et al. |
| 2010/0243377 A1 * | 9/2010 | Duval .............. 185/37 |

FOREIGN PATENT DOCUMENTS

| | | |
|---|---|---|
| JP | 2008113180 | 5/1996 |
| JP | 2005029132 | 2/2005 |
| WO | 8301424 | 4/1983 |

* cited by examiner

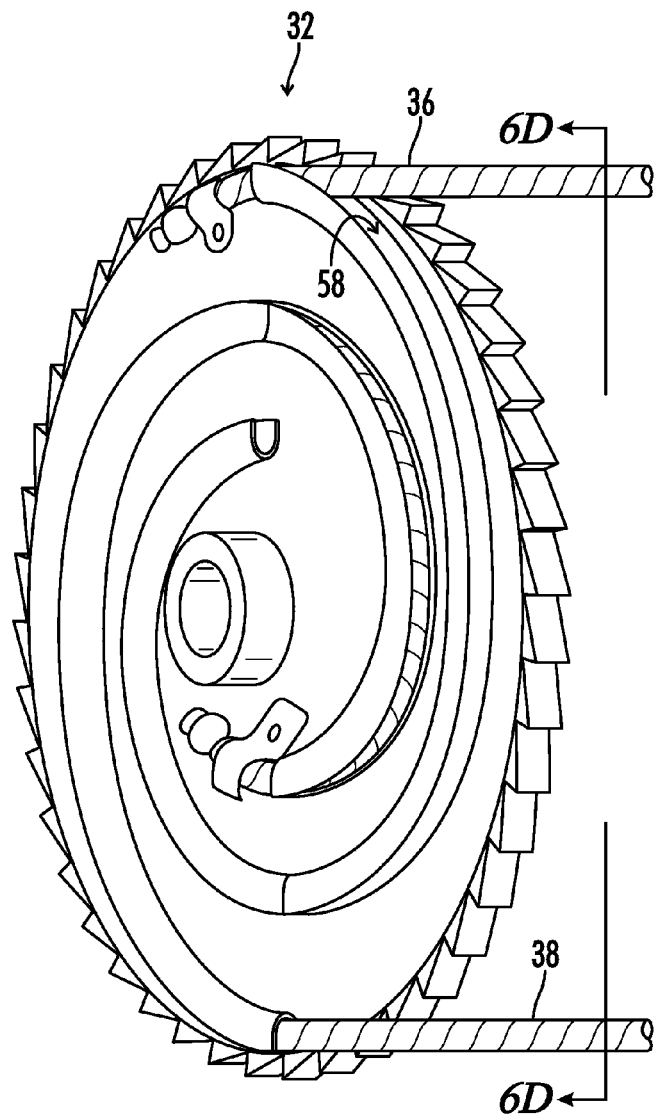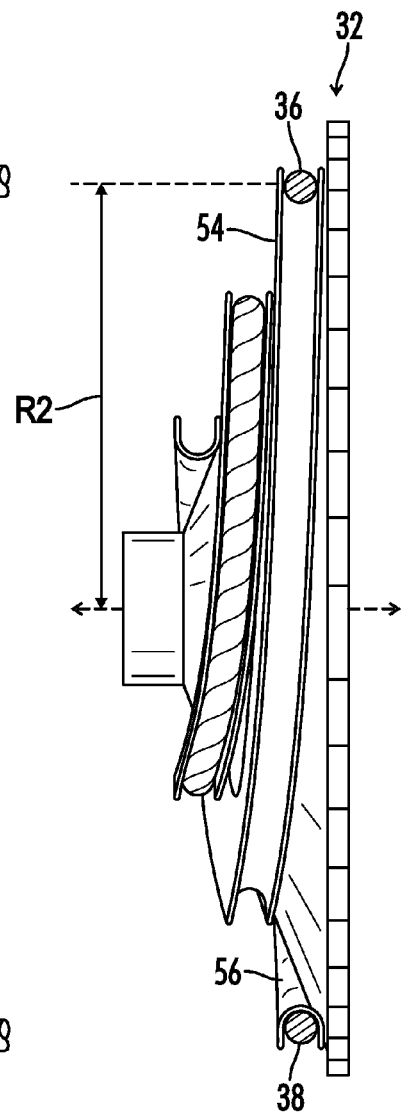
FIG. 6C
FIG. 6D

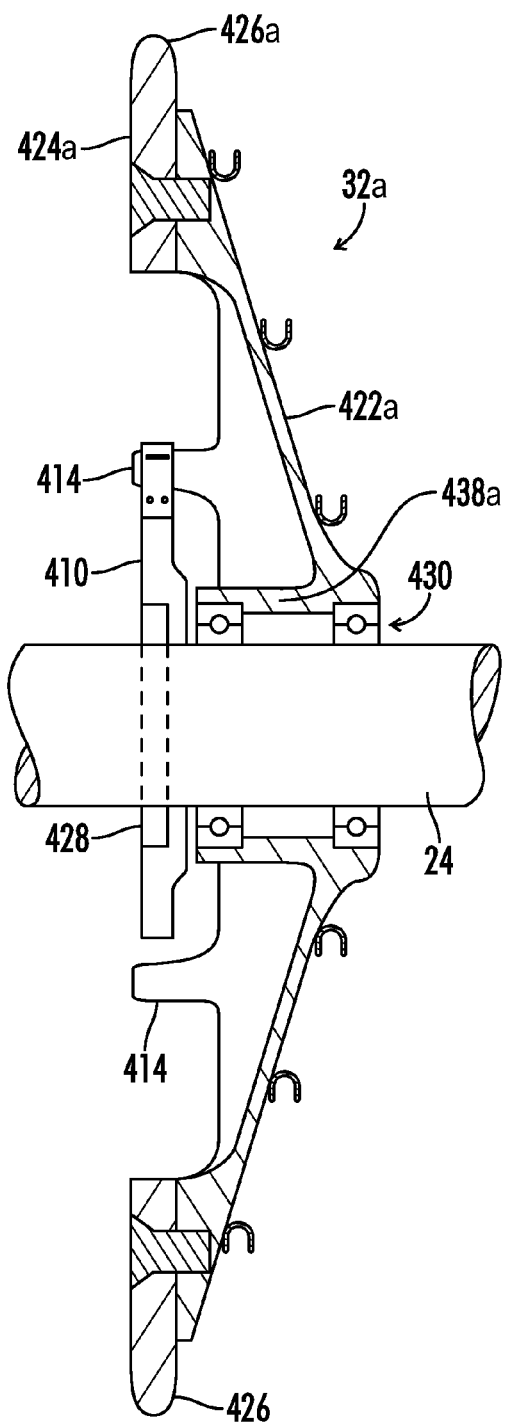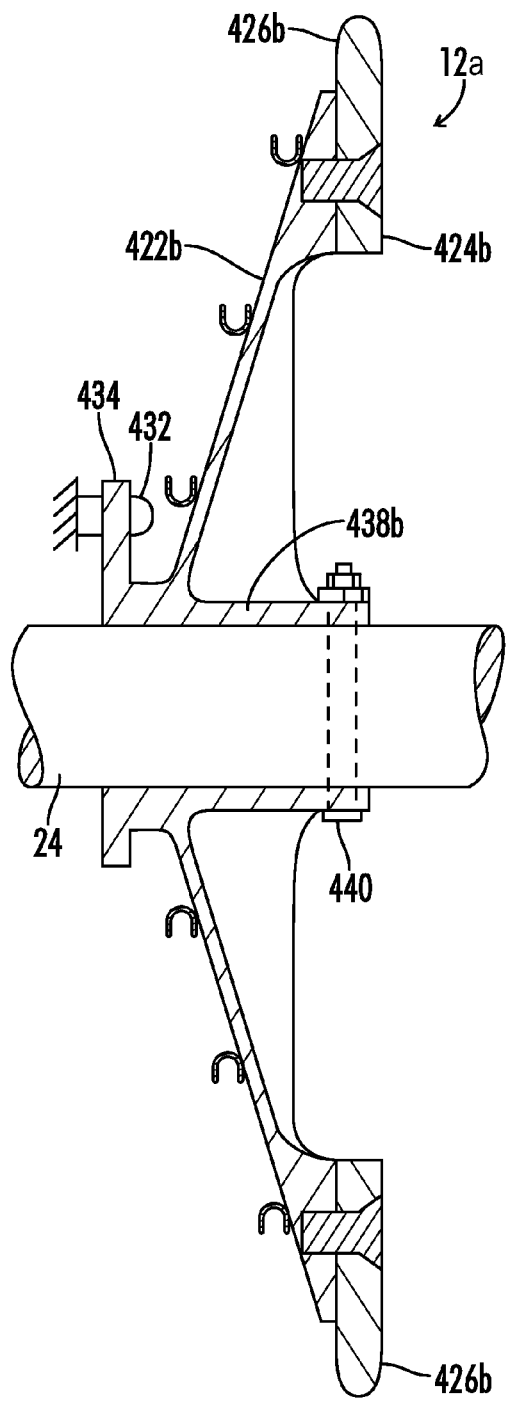
*FIG. 6G*     *FIG. 6H*

SPIRAL CONE PULLEY RECIPROCAL PEDAL DRIVE SYSTEM AND METHODS

TECHNICAL FIELD

The present disclosure relates to human-powered transportation systems and more particularly to drive systems for bicycles.

BACKGROUND

Conventional human-powered transportation systems, such as bicycles, generally include a pedal drive system wherein a user rotates a crankshaft by applying force against pedals connected to crank arms with the user's feet. Conventional bicycle drive systems typically include a forward sprocket, or chainring, attached to the crankshaft and a rear sprocket, or cog, linked to the forward sprocket by a tension chain or cable. Opposing crank arms extend from opposite sides of the forward sprocket, and pedals are pivotally attached to each crank arm end. The user then rotates the forward sprocket in one angular direction by applying revolutionary force against the pedals. As the sprocket rotates, the tension chain or cable causes the rear sprocket to turn. When the rear sprocket is linked to a wheel, forward motion is achieved.

Such conventional drive systems for human-powered applications have been in existence for hundreds of years and, while advances in braking, gearing and shifting systems are common, the basic configuration including a forward sprocket, a rear sprocket and a single tension chain extending between the two has persisted as the base technology.

Conventional human-powered transportation systems of the types described above have a number of drawbacks. One problem associated with conventional human powered transportation systems, and particularly conventional bicycles, is the finite number of available gear ratios. For example, a conventional multi-speed bicycle may have two or three front sprockets and six or seven rear sprockets. A user may shift between the different sprocket combinations by causing the chain to derail from one sprocket and engage another, but oftentimes it would be most efficient for the user to operate the bicycle using a gear ratio between two existing gears. However, the unavailability of gear ratios between those defined by the forward and rear sprockets results in lost efficiency and power where intermediate gear ratios are needed.

Another problem associated with conventional drive systems for bicycles and other types of human-powered transportation relates to the ability of a user to revolve the user's leg in one angular direction. In conventional drive systems for bicycles, a crankshaft generally includes a right crank arm and a left crank arm extending from the crankshaft on opposite sides of the bicycle. The user's right and left legs turn the crankshaft by pedaling forward. As the crankshaft turns, a front sprocket, or chainring, turns. During use, the crank arms are pedaled in only one angular direction to provide torque to the rear wheel. A user's legs must travel in a circle as each crank arm rotates about the crankshaft in the bottom bracket of the bicycle. It is well known that, by increasing the length of the crank arms, i.e. the distance between the point of force application, i.e. the pedal, and the crank shaft, or bottom bracket, a greater force may be applied to the front sprocket, or chainring. As a result, more torque can be applied to the rear wheel, as seen generally in FIGS. 12A and 12B. However, because conventional bicycle drive systems require a user's legs to move around in a complete revolution, the possible crank arm length is limited by the user's anatomy and clearance with the ground. Using the conventional design, when the crank arm length is extended beyond a threshold distance, it becomes uncomfortable or even impossible for a user to make a complete turn of the crank arms while positioned on the bicycle.

What is needed then are improvements in the conventional devices and systems for human-powered transportation, and particularly for drive systems for bicycles.

BRIEF SUMMARY

The present disclosure provides several embodiments related to a reciprocal pedal drive system. In a first embodiment, the present disclosure provides a bicycle including a frame, at least one wheel attached to the frame, a spiral cone pulley attached to the bicycle, and a first tension linkage disposed on the spiral cone pulley. The wheel is configured to turn when the first tension linkage is pulled in a direction away from the wheel.

Another aspect of the present disclosure provides a drive system including a front spiral cone pulley and a rear spiral cone pulley. A flexible tension linkage extends between the first spiral cone pulley and the rear spiral cone pulley. A further aspect of the present disclosure provides a spiral cone pulley apparatus including a disk having a first pulley side and a second pulley side, wherein the first pulley side has an axially tapered profile.

It is an object of the present disclosure to provide a drive system for a bicycle that utilizes reciprocating motion of the user's legs.

It is a further object of the present disclosure to provide a drive system for a bicycle that provides a greater number of intermediate gear ratios as compared to conventional drive systems.

Another object of the present disclosure is to provide a bicycle that includes at least one spiral cone pulley attached to the bicycle frame.

A further object of the present disclosure is to provide a shifting system for a reciprocating bicycle.

Another object of the present disclosure is to provide a modular spiral cone pulley having a detachable pulley ring and a pulley body forming a spiral cone pulley.

Yet another object of the present disclosure is to provide a kit for retrofitting an existing bicycle to include a reciprocal pedal drive system including at least one spiral cone pulley.

Numerous other objects, features and advantages of the present disclosure will be readily apparent to those skilled in the art upon a reading of the following description when taken in conjunction with the accompanying drawings.

BRIEF DESCRIPTION OF THE DRAWINGS

FIG. 6C illustrates a perspective view of an embodiment of a pedal axle spiral cone pulley in a high gear position in accordance with the present disclosure.

FIG. 6D illustrates an end view of the embodiment of a pedal axle spiral cone pulley of FIG. 6C.

FIG. 6G illustrates an alternative embodiment of a pedal axle spiral cone pulley mounted on a pedal axle.

FIG. 6H illustrates an alternative embodiment of a pedal axle spiral cone pulley mounted on a pedal axle.

DETAILED DESCRIPTION

Figure 1:
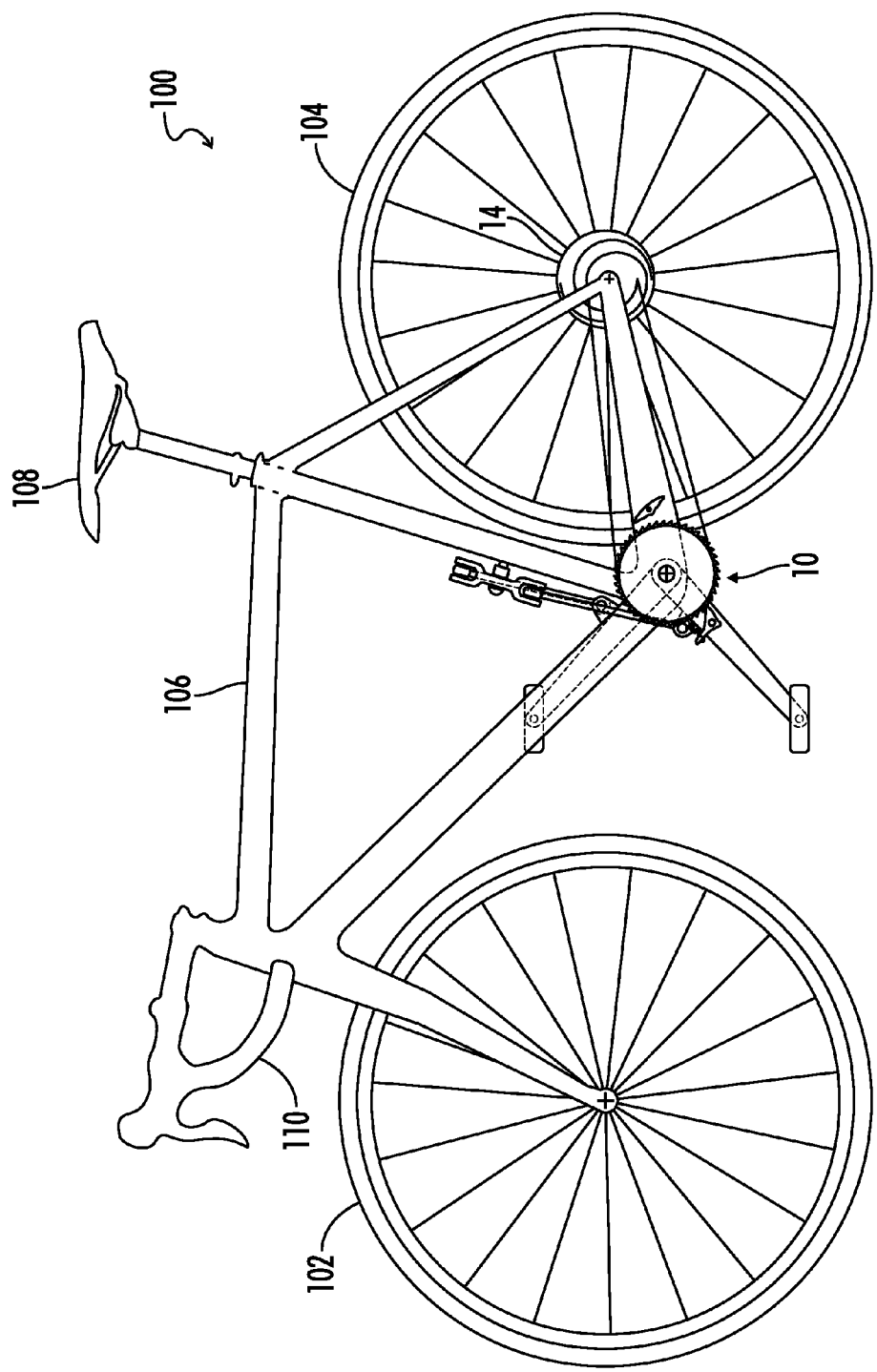
FIG. 1 illustrates a left side elevation view of a bicycle including an embodiment of a pedal drive system in accordance with the present disclosure.
Figure 2:
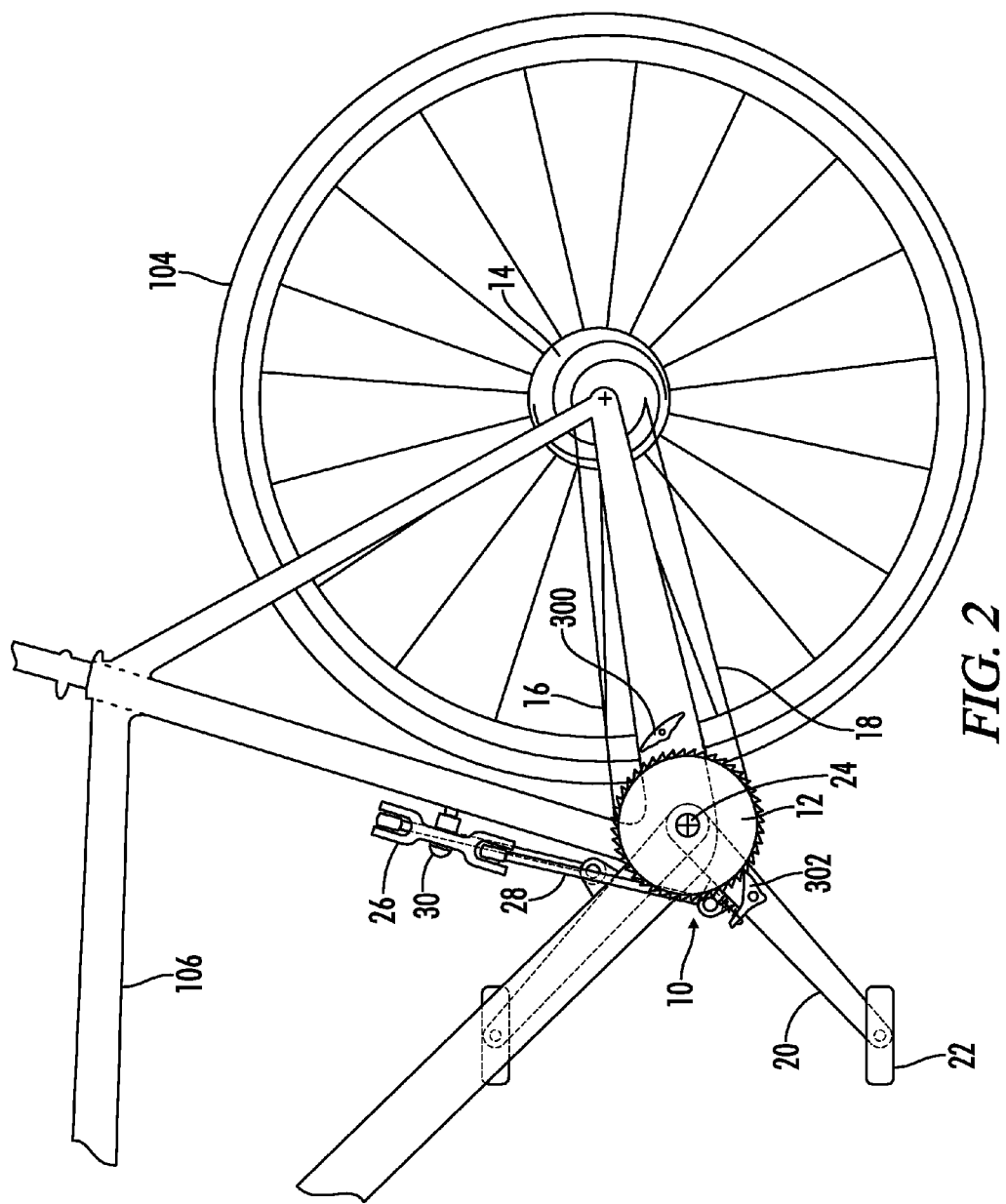
FIG. 2 illustrates a detail left side elevation view of the bicycle including the embodiment of a pedal drive system of FIG. 1.

Referring now to the drawings, FIG. 1 and FIG. 2 illustrate a side view of an embodiment of a bicycle 100 including a bicycle pedal drive system 10 in accordance with the present disclosure. Bicycle 100 includes a frame 106 and a wheel 104 attached to the frame. Wheel 104 includes a rear wheel of a bicycle in some embodiments. A spiral cone pulley 12 is attached to the frame. An object may be considered to be attached to the frame even if there is no direct mechanical contact between the object and the frame. For example, a pulley would be attached to the frame where the pulley is attached to a wheel, and the wheel is attached to the frame. Bicycle 100 also includes a seat 108 in some embodiments.

A first tension linkage 16 is disposed on the spiral cone pulley 12, and the wheel is configured to turn relative to the frame when the first tension linkage 16 is pulled in a direction away from the wheel 104. A second lightly loaded tension linkage 18 is disposed on the spiral cone pulley in an arrangement opposite to that of linkage 16 for the purpose of providing a closed loop of tension on the two spiral cone pulleys. Each tension linkage may include any type of suitable tension linkage, including but not limited to a belt, a chain or a cable. The tension linkages are attached to the cone pulleys at each linkage end. First tension linkage 16 may have one or both of its two attachments spring-loaded to keep the linkage loop taut.

Figure 3:
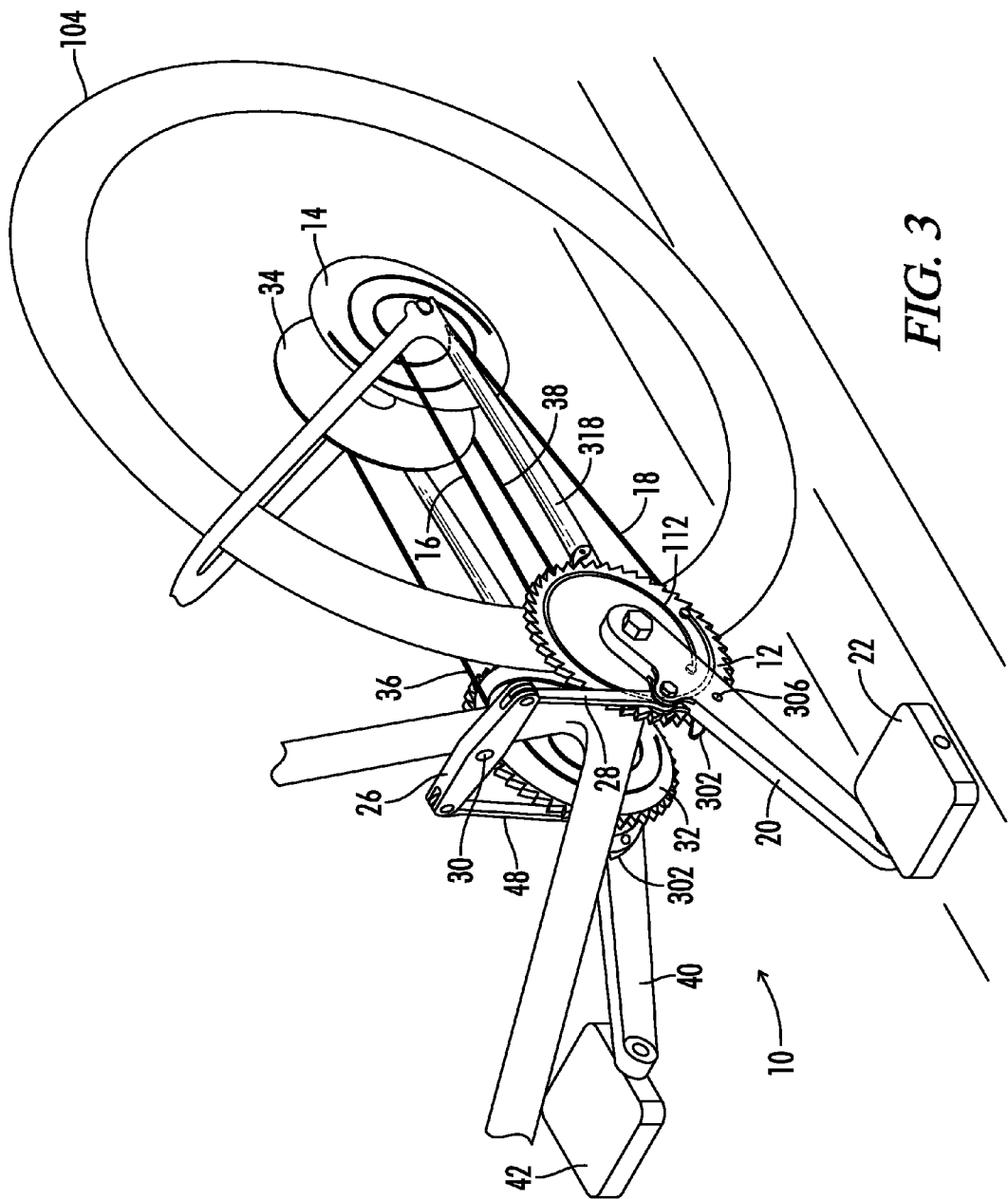
FIG. 3 illustrates a detail left side perspective view of a bicycle including an embodiment of a pedal drive system in accordance with the present disclosure.

Referring now to FIG. 3, in some embodiments, the present disclosure provides a drive system for a bicycle. The drive system generally includes a left side and a right side. The left and right sides are positioned on the bicycle to correspond to a user's body when the user is seated on the bicycle. For example, the right side of the drive system is placed on the right side of the frame and is actuated using the user's right foot, and the left side of the drive system is placed on the left side of the frame and is actuated using the user's left foot.

Referring to FIG. 3, in some embodiments, the drive system includes a first front spiral cone pulley, or left front pulley 12 and a first rear spiral cone pulley, or left rear pulley 14. A front spiral cone pulley may be referred to as a pedal axle spiral cone pulley in some embodiments because the front spiral cone pulley may be mounted on or engaged with the pedal axle, or front spindle. Similarly, a rear spiral cone pulley may be referred to in some embodiments as a wheel axle spiral cone pulley because the rear spiral cone pulley is mounted on, or engaged with, the wheel axle. The left front pulley 12 is attached to a first crank arm, or left crank arm 20. A first pedal, or left pedal 22, is attached to the first crank arm 20. Similarly, the drive system includes a second front spiral cone pulley, or right front pulley 32 and a second rear spiral cone pulley, or right rear pulley 34. The right front pulley 32 is attached to a second crank arm, or right crank arm 40. A second pedal 42 is attached to the second crank arm 40.

Rocker Assembly

The first and second crank arms 20, 40 are not rigidly connected to a bottom bracket spindle, or crankshaft 24, as is the case in a conventional bicycle. Instead, the first and second crank arms 20, 40 are independently pivotable about separate pivoting connections to the bicycle frame 106. As seen in FIG. 3, in some embodiments, the first and second crank arms 20, 40 are mechanically linked via a rocker assembly with rocker 26. Rocker 26 forms a pedal interconnect, or a crank arm interconnect, thereby relating motion in one crank arm to motion in the opposite crank arm.

Figure 11:
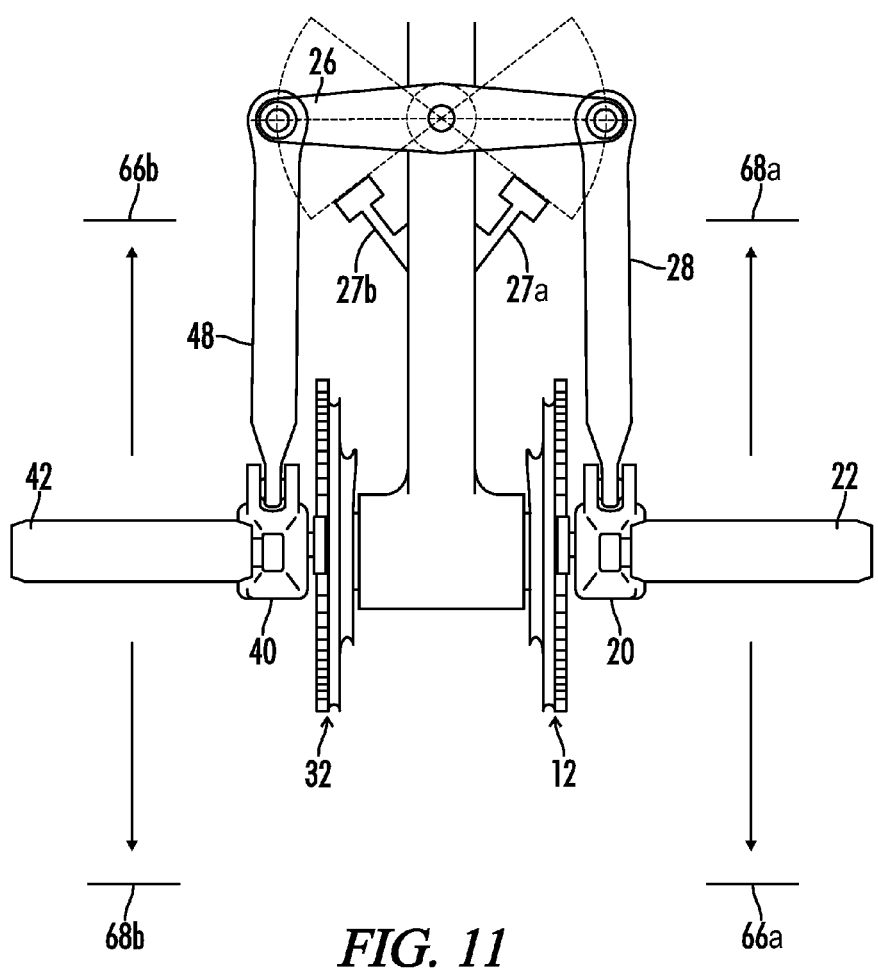
FIG. 11 illustrates an end elevation view of an embodiment of a drive system including a pedal interconnect rocker.
Figure 12A:
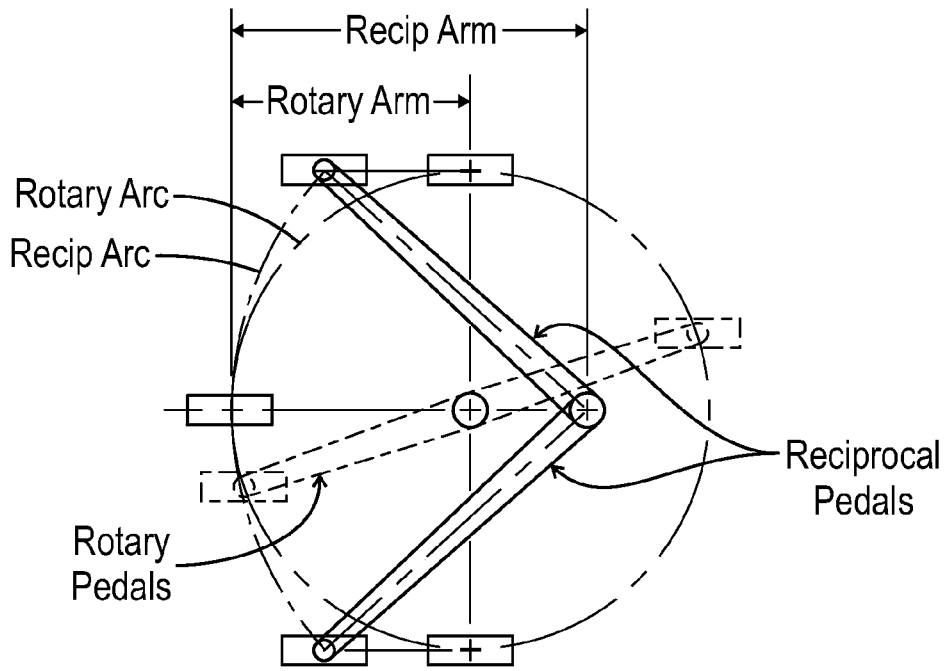
FIG. 12A illustrates a power stroke comparison of a conventional rotary arm drive system with a reciprocating drive system.
Figure 12B:
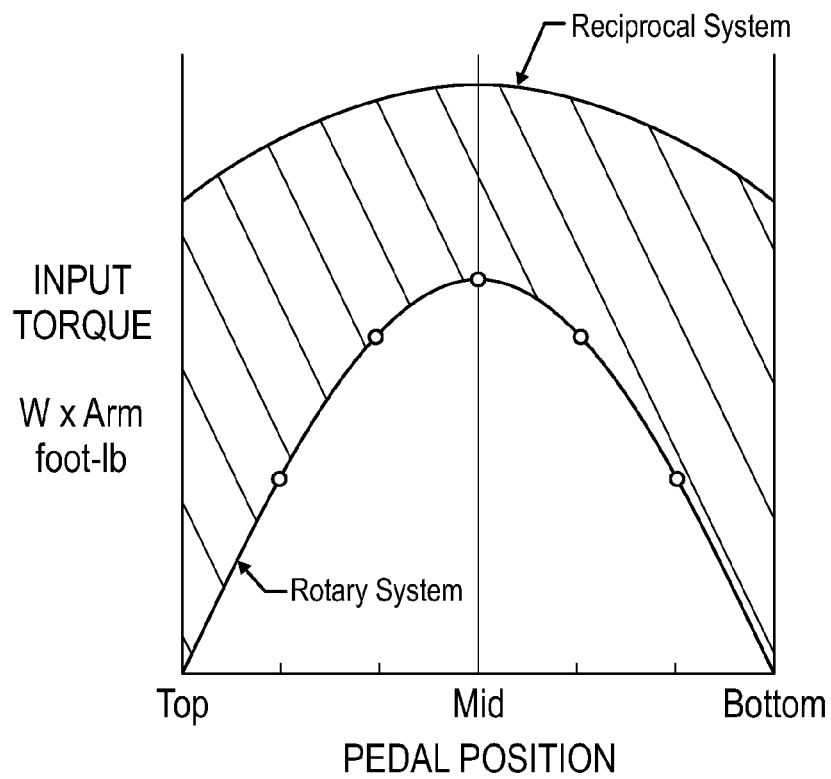
FIG. 12B illustrates a graph of input torque vs. pedal position for some exemplary rotary arm drive systems and reciprocating drive systems.

Rocker 26 is pivotally attached to the frame 106, and more particularly to the seat tube in some embodiments. Rocker 26 includes a first free end pivotally attached to a first rocker arm 28. First rocker arm 28 is pivotally attached at one end to the first crank arm 20 and at the opposite end to the first free end of rocker 26. Rocker 26 also includes a second free end pivotally attached to a second rocker arm 48. Second rocker arm 48 is pivotally attached at one end to the second crank arm 40 and at the opposite end to the second free end of rocker 26. Rocker 26 is attached to the frame at a rocker pivot 30 located between the first and second free ends of the rocker 26. Rocker 26 may pivot angularly about rocker pivot 30 in both angular directions. Angular motion of rocker 26 may be limited in some embodiments by first and second pedal travel stops 27a, 27b, as seen in FIG. 11.

First rocker arm 28 and second rocker arm 48 are rigid members in some embodiments. As such, first and second rocker arms 28, 48 may provide a linkage between left and right front pulleys 12, 32 in both tension and compression. During use, left pedal 22 may be depressed, causing left crank arm 20 to pivot toward the ground. As a result, left rocker arm 28 pulls down on rocker 26, causing rocker 26 to pivot and pull up on right rocker arm 48, thus moving right crank arm 40 upward away from the ground. Additionally, using shoes that clip into the pedals, a user may apply an upward force to right pedal 42 as left pedal 22 is pushed down. The upward force on right pedal 42 may provide a compressive force against right rocker arm 48. Because the rocker arms 28, 48 are rigid, the rocker arms may be used to transfer both compressive and tensile forces. As such, first and second crank arms are mechanically linked to each other. When one crank arm travels down, the other travels up and vice versa.

During use, the pedal drive system may be operated by applying alternating forces to the left and right pedals. For example, referring to FIG. 11, when a user would push the left pedal 22 down to a left first angular stop position 66a (mechanically defined by the relative position of first pedal travel stop 27a), the right pedal 42 would correspondingly move upward to a right first angular stop position 66b, as seen in FIG. 3. Subsequently, the right pedal 42 would be pushed down, causing the left pedal 22 to move up to a left second angular stop position 68a (mechanically defined by the relative position of second pedal travel stop 27b). During use, the pedals would be alternatively pushed down on the right and left sides by the user in an alternating reciprocating motion of the user's legs.

Power Stroke

When each pedal is pressed downward, power is transferred to rear wheel 104 via at least one power cable. A first power cable 16 is disposed on the left side of the drive system extending between left front pulley 12 and left rear pulley 14. Similarly, a second power cable 36 is disposed on the right side of the drive system extending between right front pulley 32 and right rear pulley 34. First and second power cables may include any suitable type of tension linkage such as a chain, a cable or a belt.

When left pedal 22 is pushed down, the left power cable 16 is pulled forward on left front pulley 12. The forward motion of left power cable 16 causes left rear pulley 14 to rotate forward, causing left power cable 16 to unwind from left rear pulley 14. As left rear pulley 14 rotates forward, or counter-clockwise as illustrated in FIG. 3, a freewheel, or freehub, mechanism disposed between left rear pulley 14 and rear wheel 104 engages and causes torque to be applied to rear wheel 104. Referring to FIG. 6I, in some embodiments, a freewheel 326 is disposed between left rear pulley 14 and rear wheel 104 such that rear wheel 104 may rotate freely relative to left rear pulley 14 in only one angular direction.

When left pedal 22 reaches a first angular stop position 66a, a down stroke is subsequently initiated against right pedal 42. As right pedal 42 is pushed down, right power cable 36 is pulled forward on right front pulley 12. The forward motion of right power cable 36 causes right rear pulley 34 to rotate forward, causing right power cable 36 to unwind from right rear pulley 34. As right rear pulley 34 rotates forward, or counterclockwise as illustrated in FIG. 3, a freewheel or freehub mechanism disposed between right rear pulley 34 and rear wheel 104 engages and causes torque to be applied to rear wheel 104.

Return Stroke

Each pedal down stroke is referred to as a power stroke. When the left pedal is pushed down, the left side undergoes a power stroke. When the right pedal is pushed down, the right side undergoes a power stroke. When a power stroke is performed on a side, the rear pulley on that side is generally rotated forward. Before that side can undergo a subsequent power stroke, the rear pulley on that side must be returned to its initial angular position corresponding to the beginning of the power stroke. Each rear pulley is returned to its initial angular position during a return stroke. A return stroke is defined as movement of a crank arm and pedal from its lowest angular stop position generally toward its highest angular stop position. Because of the rocker assembly linkage between crank arms, a return stroke is necessarily performed on one side when the opposite side undergoes a power stroke.

It is noted that in some embodiments, a user may wear shoes that mechanically link to the pedals. In such instances, the user may initiate a return stroke by pulling upward on a pedal. Such upward force provides an additional energy input into the drive system.

Referring to FIG. 3, during a return stroke, tension on the power cable on the return stroke side is at least partially released, and tension is applied to a return cable extending between the front pulley and the rear pulley on the return stroke side. As the return stroke progresses, the return cable is pulled away from the rear wheel and causes the rear pulley to rotate in the angular direction opposite the angular direction the pulley rotated during the power stroke. The presence of the return cable creates a closed-loop system wherein bi-directional angular movement of the front pulley creates a corresponding bi-directional angular movement of the rear pulley.

For example, referring to FIG. 3, when first crank arm 20 is pushed down via first pedal 22, first power cable 16 is pulled away from rear wheel 104, and first rear pulley 14 is angularly rotated in the counter-clockwise direction. During a subsequent return stroke, first crank arm 20 moves upward, and first return cable 18 is pulled in tension away from rear wheel 104. As first return cable 18 is pulled away from first rear pulley 14, first rear pulley 14 is angularly rotated in the clockwise direction relative to the frame back to an angular position at or near the angular position corresponding to the beginning of a subsequent power stroke.

As seen in FIG. 3, each side of the drive system includes a return cable. A first return cable, or left return cable 18 is disposed on the left side of the drive system extending between left front pulley and left rear pulley. Similarly, a second return cable, or right return cable 38 is disposed on the right side of the drive system extending between right front pulley 32 and right rear pulley 34. The second return cable 38 operates in a similar fashion as the first return cable 18. When the second crank arm 40 undergoes a return stroke, the second return cable 38 is pulled away from rear wheel 104 and causes second rear pulley 34 to rotate in an angular direction opposite the direction of rotation of the power stroke. The spiral pulleys are designed such that the return cable unwinds from the second rear pulley at the same rate as the power cable reels onto the second rear pulley such that the cables are kept taut throughout full cable travel in each direction. In some alternative embodiments, the return cable structure and function could be replaced with one or more springs acting on the rear spiral pulley to return it to the pre-power stroke position.

On each side, the power cable and the return cable provide the motion of the rear pulley, causing the rear pulley to rotate in a first angular direction over a first finite displacement angle during a power stroke and then to reverse and rotate in a second angular direction over a second finite displacement angle during a return stroke. In some embodiments, the first and second finite displacement angles of the rear pulley are substantially the same during normal non-shifting operation of the drive system.

Spiral Cone Pulley Drive System

Figure 4A:
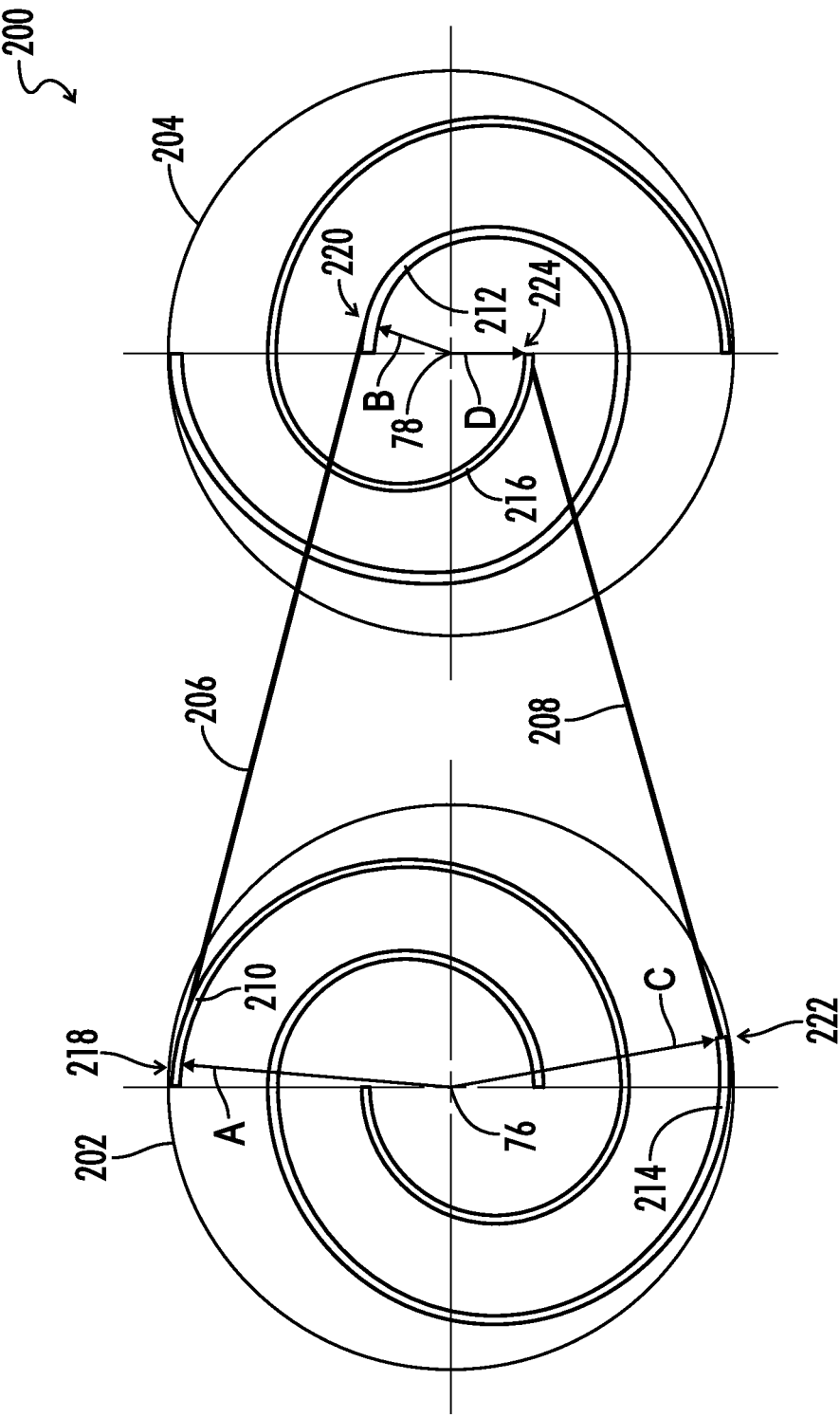
FIG. 4A illustrates a schematic view of an embodiment of a drive system in accordance with the present disclosure.

Referring now to FIG. 4A, an embodiment of a drive system including two spiral cone pulleys is generally illustrated. As seen in FIG. 4A, a first spiral cone pulley 202 is rotatable about a first pulley axis 76, and a second spiral cone pulley 204 is rotatable about a second pulley axis 78. The distance between the first and second pulley axes is generally fixed. A tension linkage, or power cable 206, extends between the first and second spiral cone pulleys. The power cable 206 is rigidly attached at its first end to the first spiral cone pulley 202 and at its second end to second spiral cone pulley 204. A first power cable guide channel 210 is defined in the first cone pulley 202, and a second power cable guide channel 212 is defined in the second cone pulley 204. The first and second power cable guide channels generally form recessed channels which are shaped to receive the respective ends of the power cable. The power cable and return cable may operate within substantially the same plane which is parallel to the centerline of the bicycle in some embodiments. Each spiral cone pulley can include a first linkage guide 54, seen in FIG. 6A defining a first guide channel 58 for housing the power cable 36, and a second linkage guide 56 defining a second guide channel 60 for housing the return cable 38. Each linkage guide may include an attachment such as a U-shaped tray that is welded onto or otherwise attached to the cone-shaped pulley body. In other embodiments, one or both linkage guides may be integrally formed on the cone-shaped pulley body such that one or both guide channels are integral to the pulley body. As such, in some embodiments, a spiral cone pulley may include a unitary, one-piece construction.

Referring further to FIG. 4A, first cable guide channel 210 is formed in a spiral shape. As such, first cable guide channel 210 at each angular position includes a radius from the first pulley axis 76. The radius increases in a given angular direction around the pulley. As seen in FIG. 4A, the power cable 206 engages the first spiral cone pulley 202 at a first power cable engagement location 218. Radius A is defined as the distance between the first pulley axis 76 and the first power cable engagement location 218. Similarly, the power cable 206 engages the second spiral cone pulley 204 at a second power cable engagement location 220. Radius B is defined as the distance between the second pulley axis 78 and the second power cable engagement location 220.

Radius A as compared to radius B provides a gear ratio indicative of the difficulty of pedaling the bicycle. For example, as seen in FIG. 4A, radius A is near its largest possible value for the front spiral cone pulley 202, and radius B is near its smallest possible value for the rear spiral cone pulley 204. The configuration seen in FIG. 4A provides a relatively high gear ratio wherein a finite angular displacement of first spiral cone pulley 202 in a counterclockwise direction will cause a corresponding larger angular displacement of second spiral cone pulley 204 in the same counterclockwise direction.

Gear Ratio

For a given set of first and second spiral cone pulleys 202, 204, numerous gear ratios are possible by shifting the initial angular positions of the pulleys. When the initial angular position of first spiral cone pulley 202 is changed, radius A changes, and when the initial angular position of second spiral cone pulley 204 is changed, radius B is changed. By changing the radii A and B, the gear ratio may be changed.

Figure 4B:
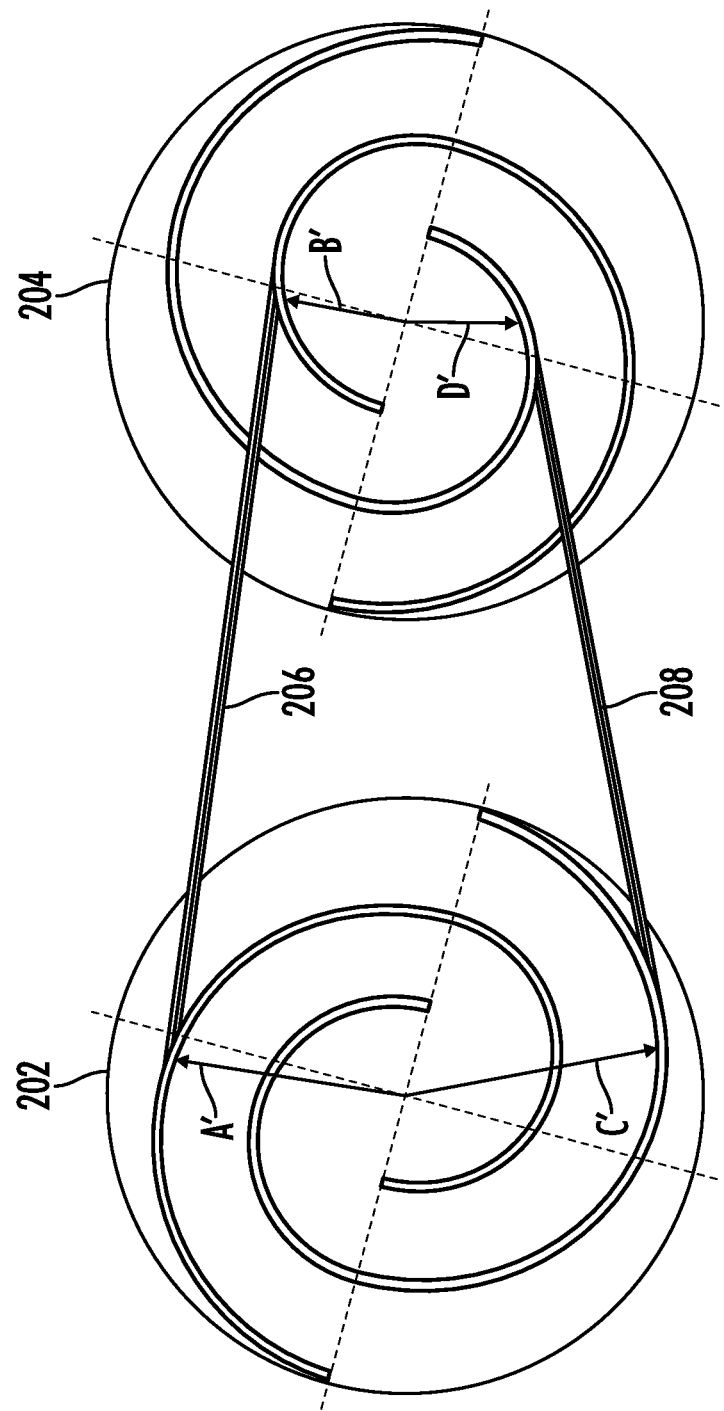
FIG. 4B illustrates a schematic view of an embodiment of the drive system of FIG. 4A showing the first and second pulleys angularly displaced.

Referring now to FIG. 4B, by shifting the initial angular positions of first and second spiral cone pulleys 202, 204 in the counter-clockwise direction, the gear ratio is changed. As seen in FIG. 4B, radius A is decreased to a new radius A' less than radius A, and radius B is increased to a new radius B' greater than radius B. As such, the configuration seen in FIG. 4B provides a lower gear ratio than the configuration seen in FIG. 4A. The gear ratio can be further reduced by shifting the initial angular position of each pulley even further in the counterclockwise direction. The gear ratio can also be increased by shifting the initial angular position of each pulley in the opposite, or clockwise, direction.

By providing first and second spiral cone pulleys that are angularly moveable about each first and second pulley axis 76, 78, respectively, the drive system 200 includes a large number of possible gear ratios. Each drive pulley may be angularly repositioned only a fraction of a degree to achieve a new gear ratio. At each different angular position, a new gear ratio is achieved. In contrast to conventional drive systems for bicycles which require separate front chainrings and rear sprockets, or cogs, for each pre-defined gear ratio, drive system 200 is able to achieve numerous gear ratios with single front and rear pulleys on each side.

Referring further to FIG. 4A and FIG. 4B, first spiral cone pulley 202 includes a first return cable engagement location 222 at the location where the first end of return cable 208 engages first return cable guide channel 214. Similarly, second spiral cone pulley 204 includes a second return cable engagement location 224 at the location where the second end of return cable 208 engages second return cable guide channel 216. Radius C defines a distance between first pulley axis 76 and first return cable engagement location 222, and radius D defines a distance between second pulley axis 78 and second return cable engagement location 224. As noted above for radii A and B, radii C and D change when first and second spiral cone pulleys 202, 204 are rotated to adjust the gear ratio. For example, as seen in FIG. 4B, when first and second spiral cone pulleys 202, 204 are rotated counterclockwise to adjust the initial angular position of each pulley, radius C decreases to a new radius C' less than radius C, and radius D increases to a new radius D' greater than radius D. Due to the decrease in the radius of operation of the cable on the first spiral pulley and the subsequent increase in the radius of operation on the second spiral pulley, the gear ratio at any position in the cycle will remain constant in some embodiments.

Spiral Cone Pulley

Figures 6A, 6B:
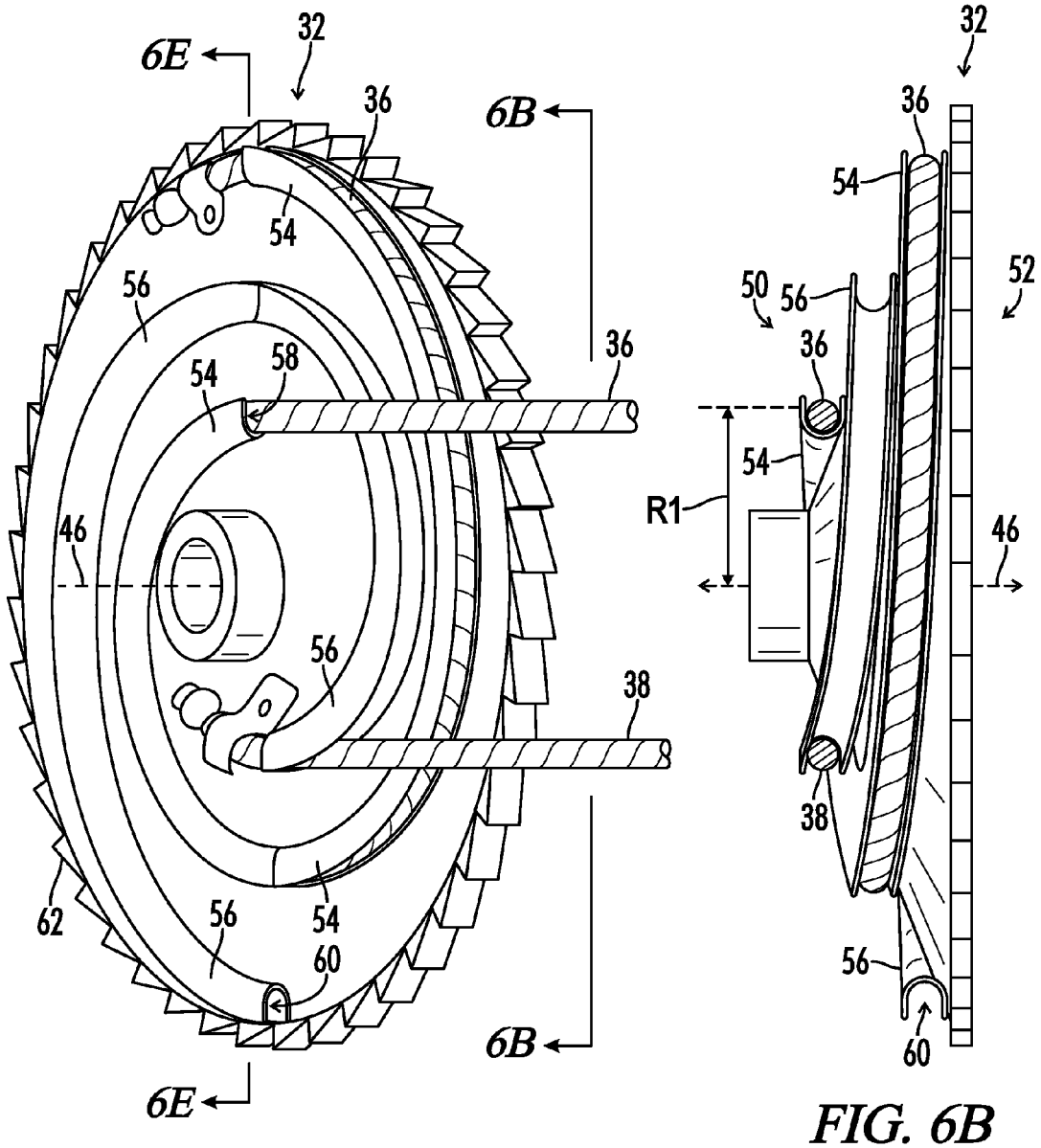
FIG. 6A illustrates a perspective view of an embodiment of a pedal axle spiral cone pulley in a low gear position in accordance with the present disclosure.
FIG. 6B illustrates an end view of the embodiment of a pedal axle spiral cone pulley of FIG. 6A.

Referring again to FIG. 3 and to FIGS. 6A-6E, an embodiment of a spiral cone pulley for attachment to a bicycle is generally illustrated in various views. FIG. 6A illustrates an embodiment of a right front pulley 32 which includes a spiral cone pulley. Right front pulley 32 is illustrated as an example of an embodiment of a spiral cone pulley for use on a bicycle. It is understood that the various embodiments of the present disclosure may be used with other types of human-powered machinery, and spiral cone pulleys in accordance with the present disclosure may include configurations not illustrated in FIGS. 6A-6E.

Right front pulley 32 includes a disk having a first pulley side 50 and a second pulley side 52, as seen in FIG. 6B. First pulley side 50 generally includes an axially-tapered profile along the pulley axis 46. An axially-tapered profile is defined as a shape that decreases in guide channel radius from the axis of rotation as the surface advances in an axial direction. Guide channel radius is defined as the local distance from axis 46 to the interior surface of a guide channel at a given axial location. For example, the spiral cone pulley illustrated in FIG. 6E includes a pulley axis 46. The axially-tapered profile is characterized by a decrease in guide channel radius in the axial direction going from second pulley side 52 to first pulley side 50. For example, at a first axial location 88, right front pulley 32 includes a first guide channel radius 80, and at a second axial location 90 along axis 46, pulley 32 includes a second guide channel radius 82, wherein the second guide channel radius 82 is less than the first guide channel radius 80. One characteristic of a spiral cone pulley in accordance with the present disclosure is an axially-tapered profile.

Figure 6E:
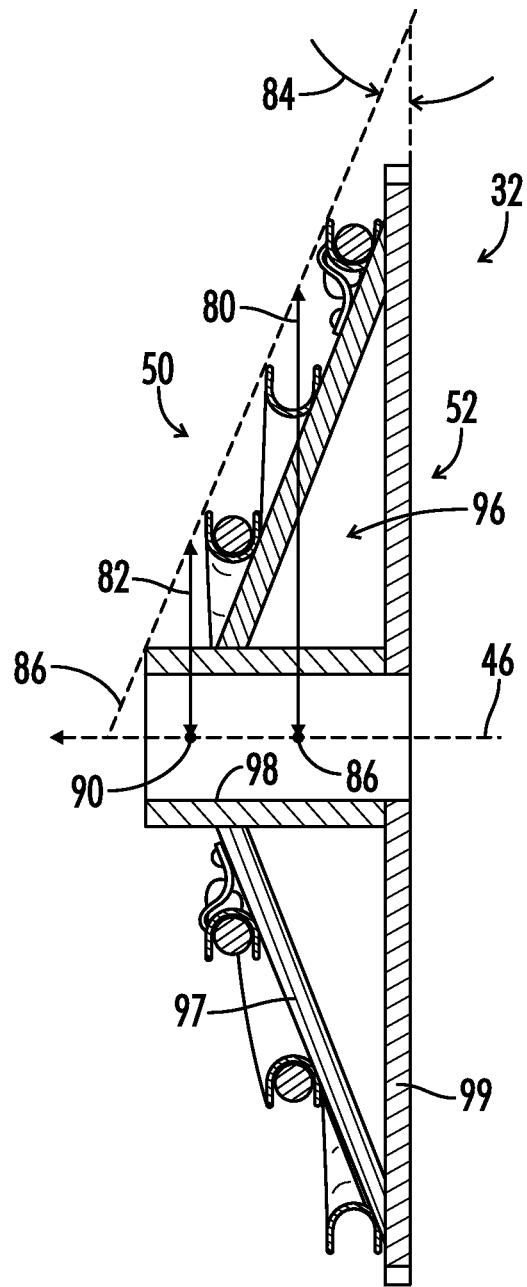
FIG. 6E illustrates a partial cross-sectional view of an embodiment of a general spiral cone pulley.

As seen in FIG. 6E, in some embodiments, second pulley side 52 forms a substantially planar surface, and the pulley is shaped to fit inside a cone formed by a reference line 86 rotated about axis 46. In some embodiments, the reference line 86 forms a cone angle 84 with the plane of second pulley side 52. Cone angle 84 in some embodiments may range between about five degrees and about eighty-five degrees in some embodiments. In other embodiments, cone angle 84 may range between about ten degrees and about forty-five degrees. Another feature of a spiral cone pulley includes at least one guide channel defined on, or attached to, the spiral cone pulley with a decreasing radius along the axial direction away from the second pulley side 52.

Referring now to FIG. 6A and FIG. 6B, right front pulley 32 is illustrated in a relatively low gear setting with right power cable 36 extending from first guide channel 58 at a relatively small radius from pulley axis 46, as indicated by radius R1 in FIG. 6B. Similarly, right return cable 38 extends from second guide channel 60 at a relatively small radial distance from axis 46, indicating a low gear position of front right pulley 32.

Referring now to FIG. 6C and FIG. 6D, front right pulley 32 is illustrated in a different axial position corresponding to a different gear setting. In the position seen in FIG. 6C, right front pulley 32 is rotated approximately 180 degrees about axis 46 from the position seen in FIG. 6A. As seen in FIG. 6C, the right front pulley 32 is positioned such that the power cable 36 extends from first guide channel 58 at a radial distance illustrated by radius R2 in FIG. 6D. At this higher gear setting, the radius R2 is greater than the lower gear setting radius R1 seen in FIG. 6B. A large range of intermediate gear ratios are available between the extreme low gear setting illustrated in FIG. 6A and the extreme high gear setting illustrated in FIG. 6C. The range of intermediate gear ratios corresponds to the possible angular positions of the pulley. The total gear ratio of the spiral pulley system from high gear to low gear is the sum of the ratios of the pulley pair.

Figure 6F:
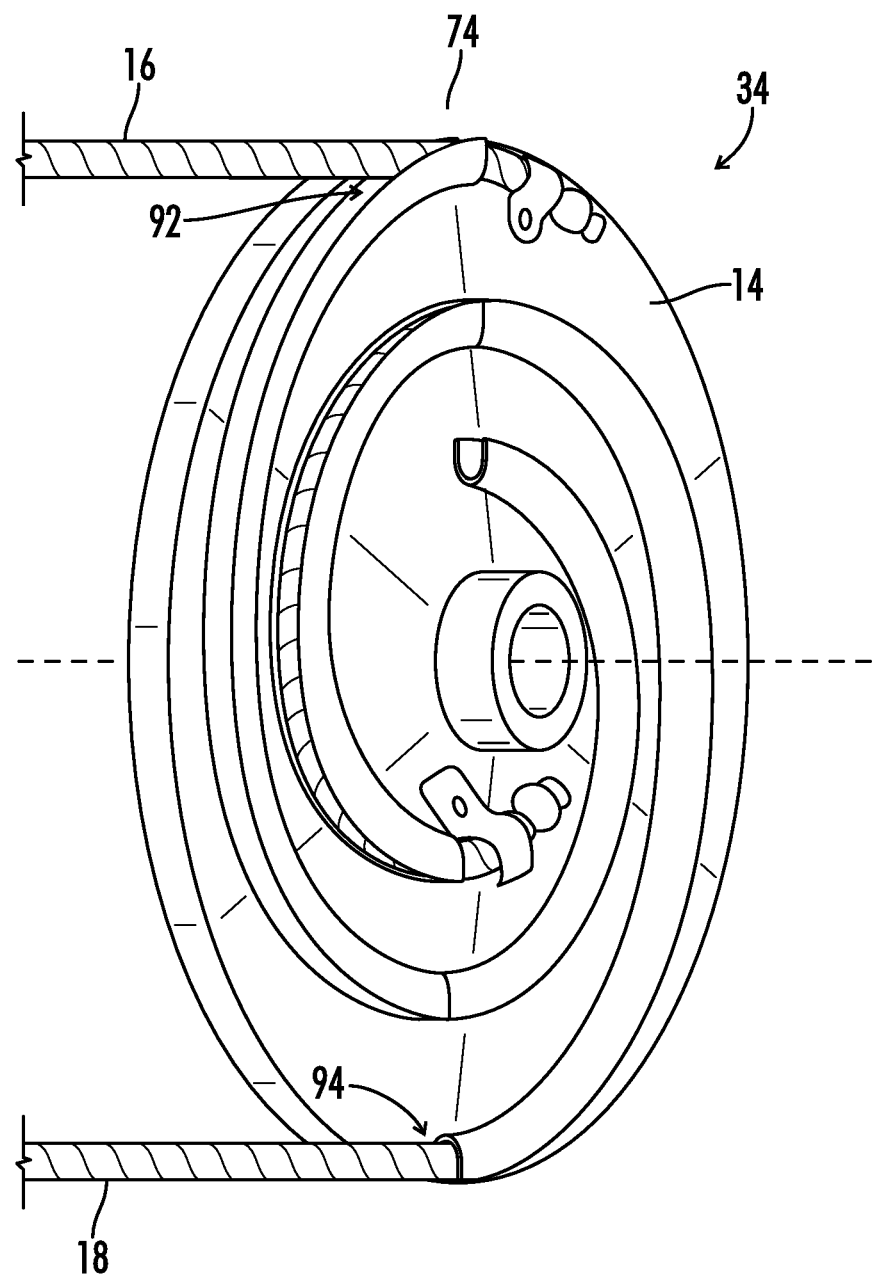
FIG. 6F illustrates a perspective view of an embodiment of a wheel axle spiral cone pulley.
Figure 6I:
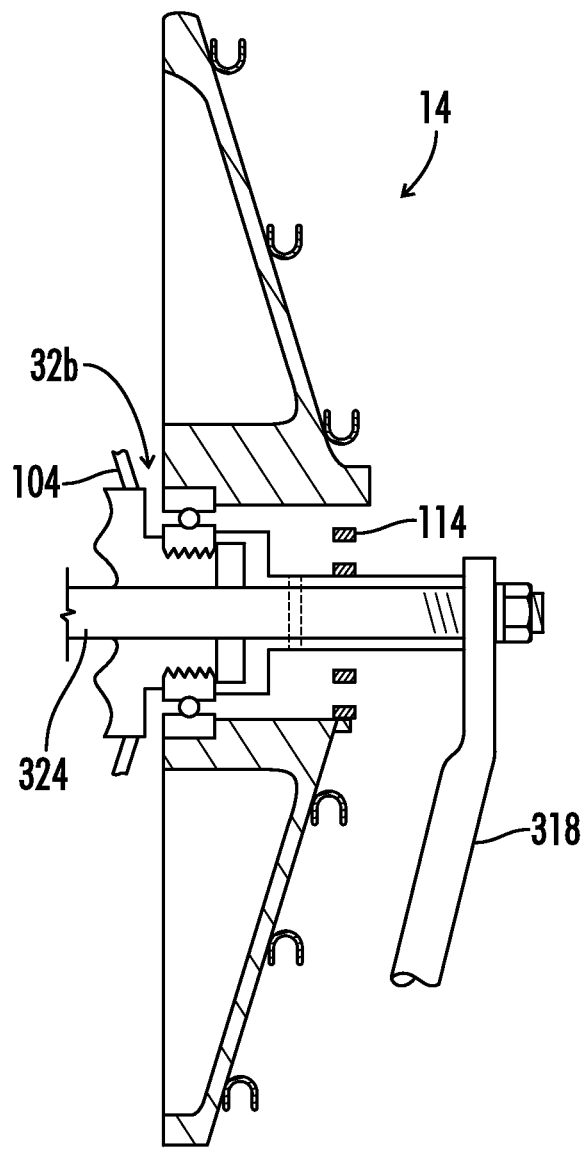
FIG. 6I illustrates an embodiment of a wheel axle spiral cone pulley mounted on a wheel axle.

Referring again to FIG. 3 and to FIG. 6A, it is noted that in some embodiments, right front pulley 32 includes a plurality of pulley teeth 62 disposed about the perimeter of the pulley. The pulley teeth 62 may be angled such that they are configured to engage a corresponding ratchet feature disposed on another structure. As seen in FIG. 6F, one or more rear spiral cone pulleys 34 may include a rear pulley perimeter 74 that does not include pulley teeth. The rear pulley perimeter 74 may be substantially smooth in some embodiments.

Also, as seen in FIG. 6F, in some embodiments, left rear cone pulley 14 may include a third guide channel 92 and a fourth guide channel 94. Third and fourth guide channels 92, 94 may be integrally formed in left rear pulley 14 or may be formed by a separate spiral-shaped tray that is attached to a cone-shaped body.

Referring further to FIG. 6E, in some embodiments, front or rear spiral cone pulley may include an interior cavity 96. The cone-shaped pulley has a load-carrying shear face on cone plate 97 that forms the cone and a structural ribbed interior which forms an interior cavity 96 to house supporting mechanisms. Interior cavity 96 may be defined by a side plate 99 disposed on the second pulley side 52 and a cone-shaped cone plate 97 disposed on the first pulley side 50. An internal pulley hub 98 may be disposed concentrically about cone axis 46. The hub 98, cone plate 97 and side plate 99 may be mechanically attached to each other. In some embodiments, these features may be welded together. In other embodiments, these features may be attached using any variety of suitable mechanical attachment means. In other embodiments, these features may be integrally formed in a machining or a molding or casting process.

Modular Spiral Cone Pulley

In some embodiments, a spiral cone pulley in accordance with the present invention may include a modular assembly including a cone pulley body and a detachable pulley gear ring. For example, referring to FIG. 6G, a modular right front spiral cone pulley 32a in some embodiments includes a first pulley body 422a including a substantially angled, or cone shape. The first pulley body 422a includes a first body tube 438a forming an annular tube. The modular right front spiral cone pulley 32a is mounted on a crankshaft 24, also referred to as a pedal axle or a front spindle in some embodiments. Modular right front spiral cone pulley 32a is generally rotatable about crankshaft 24 via a right front bearing assembly 430 disposed between first body tube 438a on first pulley body 422a and crankshaft 24.

First pulley body 422a generally includes a substantially flat first mounting surface oriented in a plane substantially transverse to the crankshaft axis. A first pulley ring 424a may be detachably secured to the first mounting surface on first pulley body 422a. First pulley ring 424a generally includes a toothed outer perimeter 426a including a finite number of gear teeth for engagement by a drive system. By providing a detachable first pulley ring 424a, modular right front spiral cone pulley 32a may be re-used in various applications with different numbers or shapes of gear teeth. Also, by providing a modular assembly, first pulley ring 424a may be replaced if it becomes damaged or worn without having to replace the entire spiral cone pulley. First pulley ring 424a may be secured to first pulley body 422a using one or more pulley ring fasteners or any other suitable attachment means.

Referring now to FIG. 6H, an embodiment of a modular left front spiral cone pulley 12a is generally illustrated. A modular left front spiral cone pulley 12a includes a second cone body 422b. The second cone body 422b includes a different construction than first cone body 422a. Second cone body 422b includes a second body tube 438b that forms an annular tube shaped for receiving crankshaft 24. Second body tube 438b may be integrally formed on second cone body 422b in some embodiments. Second body tube 438b is rigidly attached to crankshaft 24 in some applications. Thus, when crankshaft 24 is rotated, modular left front spiral cone pulley 12a is also rotated. Second cone body 422b together with second body tube 438b may be both integrally formed on crankshaft 24 in a unitary, one-piece construction in some embodiments. In other embodiments, second cone body 422b together with second body tube 438b may be fixed to crankshaft 24 via a second body tube fastener, seen in FIG. 6H.

Second pulley body 422b generally includes a substantially flat second mounting surface oriented in a plane substantially transverse to the crankshaft axis. A second pulley ring 424b may be detachably secured to the second mounting surface on second pulley body 422b. Second pulley ring 424b generally includes a toothed outer perimeter 426b including a finite number of gear teeth for engagement by a drive system. By providing a detachable second pulley ring 424b, modular left front spiral cone pulley 12a may be re-used in various applications with different numbers or shapes of gear teeth. Also, by providing a modular assembly, second pulley ring 424b may be replaced if it becomes damaged or worn without having to replace the entire spiral cone pulley.

Another feature of each modular spiral cone pulley assembly is reduction in weight by forming each pulley ring 424 and each pulley body 422 of dissimilar materials. For example, in some embodiments, first and second pulley rings 424a, 424b are made of a harder metal such as a steel, and first and second pulley bodies 422a, 422b are made of a lighter weight metal such as aluminum. In various other embodiments, first and second pulley bodies 422a, 422b are made of a lighter-weight non-metallic material such as a composite material or a polymer material.

In various other embodiments, one or more rear spiral cone pulleys may also include a modular construction including a cone body and a detachable pulley ring.

Reciprocal Spiral Drive Operation

Pedaling a reciprocal drive vehicle allows both feet to operate forward of the pedal pivot axle. The required operating force on each pedal is nearly constant and is directed downward utilizing all of the potential energy gathered by lifting the body weight to the starting height. The length of the power stroke can be the same as for a spin pedal system. The reciprocal system allows the operation of each pedal over the full stroke allowed, or over only a portion of the available stroke at any section in the stroke. The spiral drive system is dependent on the reciprocal force input. Like the spin pedal system, the input motion can be stopped, allowing coasting with the operator standing on the pedals held in any configuration desired. A unique feature of the spiral drive of the present invention is the ability to downshift without limiting the application of power. Also, the ability to achieve a large number of gear ratios quickly with the push of a button while climbing a hill with no back off on power is unique to some embodiments of the spiral drive of the present invention. Upshifting is just as easy by ceasing pedaling and pushing another button which allows going from a low gear ratio to a high gear ratio, or any gear ratio in between, quickly.

Power Pawl

A power pawl may be disposed on one or more crank arms or other structures for engaging one or more spiral cone pulleys.

Referring further to FIG. 2, FIG. 5 and FIGS. 7A-7C, a power pawl 302 is pivotally attached to crank arm 226 at a power pawl pivot 306. Power pawl 302 may be actuated by a power pawl cable 310. Power pawl cable 310 may be coupled to a user control and a manual or a powered actuator allowing a user to control operation of power pawl 302.

A power pawl may include at least three operative modes in some embodiments. In a first mode, a power pawl may be angularly locked about a power pawl pivot such that the power pawl may not be disengaged from pulley teeth on a corresponding spiral cone pulley, and the spiral cone pulley cannot rotate freely in either angular direction. In a second mode, a power pawl may be allowed to resiliently pivot about power pawl pivot in a ratcheting manner such that the power pawl will only allow the spiral cone pulley to rotate in one angular direction. In a third mode, a power pawl may be completely disengaged from the spiral cone pulley such that the spiral cone pulley is allowed to rotate in either angular direction.

In some embodiments, a power pawl spring 314 may be disposed between power pawl 302 and power pawl cable 310 for biasing power pawl in an engaged position. Power pawl 302 may be attached to crank arm 226 such that, when front spiral cone pulley 202 is angularly locked by shift lock pawl 300, power pawl 302 may ratchet in the second power pawl mode along the outer perimeter of front spiral cone pulley 202 as crank arm 226 is moved upwards in a return stroke.

Shifting System and Methods

In some embodiments, it may be desirable to change the angular position of a front and/or a rear spiral cone pulley in order to achieve a different gear ratio between the two members. This concept is generally illustrated in FIG. 4A and FIG. 4B, wherein the first and second pulleys 202, 204 are illustrated at different angular positions. By changing the angular position of the first and/or second pulleys, the gear ratio can be changed.

An embodiment of a shifting apparatus for a spiral cone pulley drive system is disclosed. The embodiment of a shifting apparatus and method disclosed herein is only intended as an example and is not the only shifting apparatus and method for changing the angular orientation of a front and/or a rear spiral cone pulley on a bicycle.

Shift Lock Pawl

Figure 5:
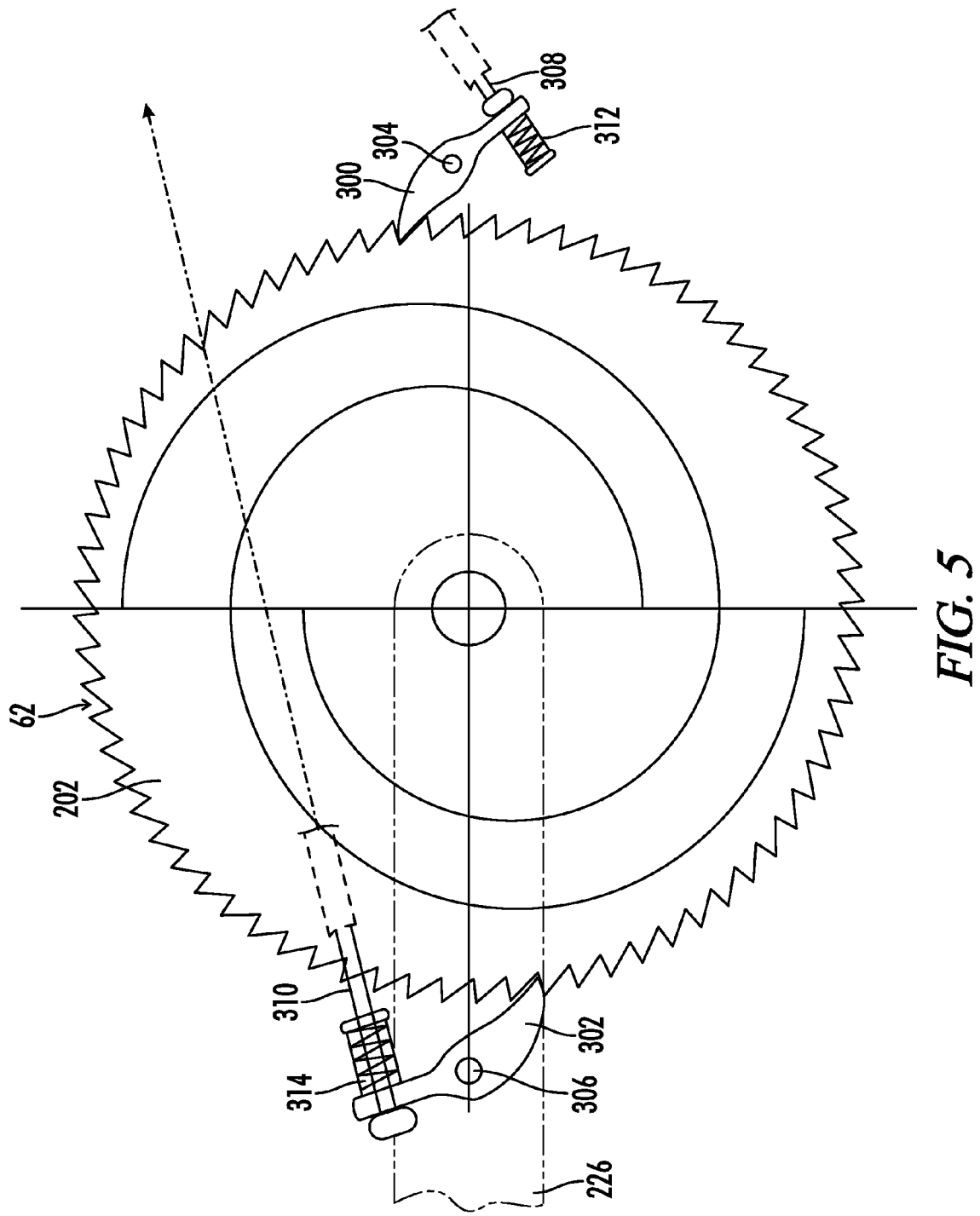
FIG. 5 illustrates a schematic view of an embodiment of a pedal axle pulley including a shift lock pawl and a power pawl.

Referring now to FIG. 2 and FIG. 5, in some embodiments, a shift lock pawl 300 is disposed on the bicycle. Shift lock pawl 300 is generally pivotable about a shift lock pawl pivot 304. In some embodiments, shift lock pawl 300 is attached to a chainstay 318, seen in FIG. 3, on the bicycle. The chainstay extends between the bottom bracket supporting the crankshaft and the rear wheel axle. Shift lock pawl 300 includes a free end selectively moveable toward and away from the first spiral cone pulley 202. The shift lock pawl 300 may be actuated using a shift lock cable 308, seen in FIG. 5. Shift lock cable 308 may be operatively connected to a shift lock control. Shift lock control may include a manual switch or lever located on the bicycle. In some embodiments, the shift lock control is located on the handlebars. In other embodiments, the shift lock control may include an electronic control such as a solenoid for selective engagement of shift lock pawl 300 with front spiral cone pulley 202. A shift lock spring 312 may be disposed on shift lock pawl 300 for biasing shift lock pawl 300 in an open position such that shift lock pawl 300 is not inadvertently engaged during use.

Generally, the purpose of shift lock pawl 300 is to selectively lock front spiral cone pulley 300 from rotating angularly in the clockwise direction as viewed in FIG. 5. When shift lock pawl 300 engages pulley teeth 62 on front spiral cone pulley 202, the front spiral cone pulley 202 is unable to angularly rotate in a clockwise direction as the crank arm associated with front spiral cone pulley 202 is moved upwards in a return stroke.

Figure 7A:
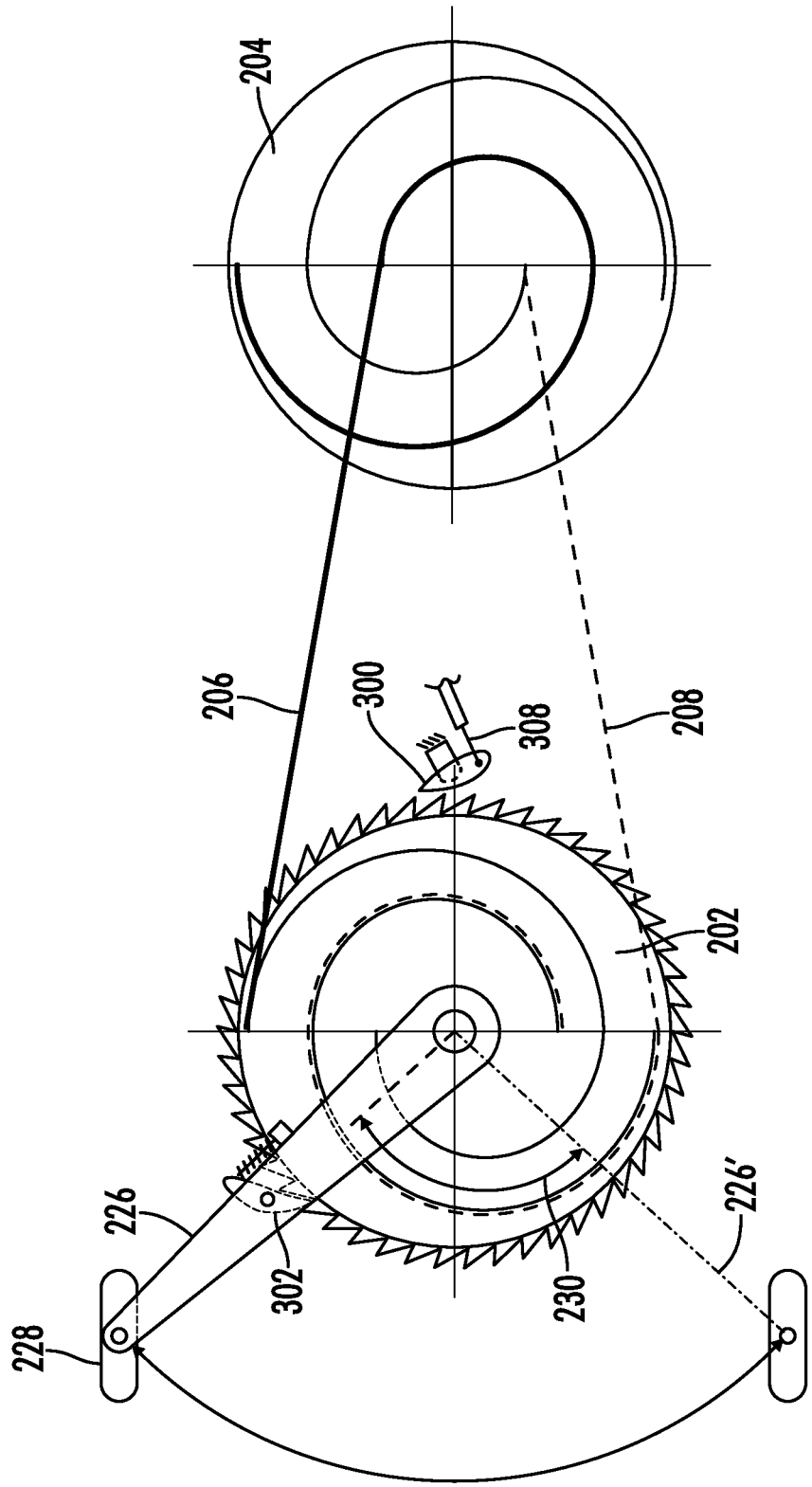
FIG. 7A illustrates a left side elevation view of an embodiment of a drive system including a first and second spiral cone pulleys with a crank arm at the beginning of a power stroke.
Figure 7B:
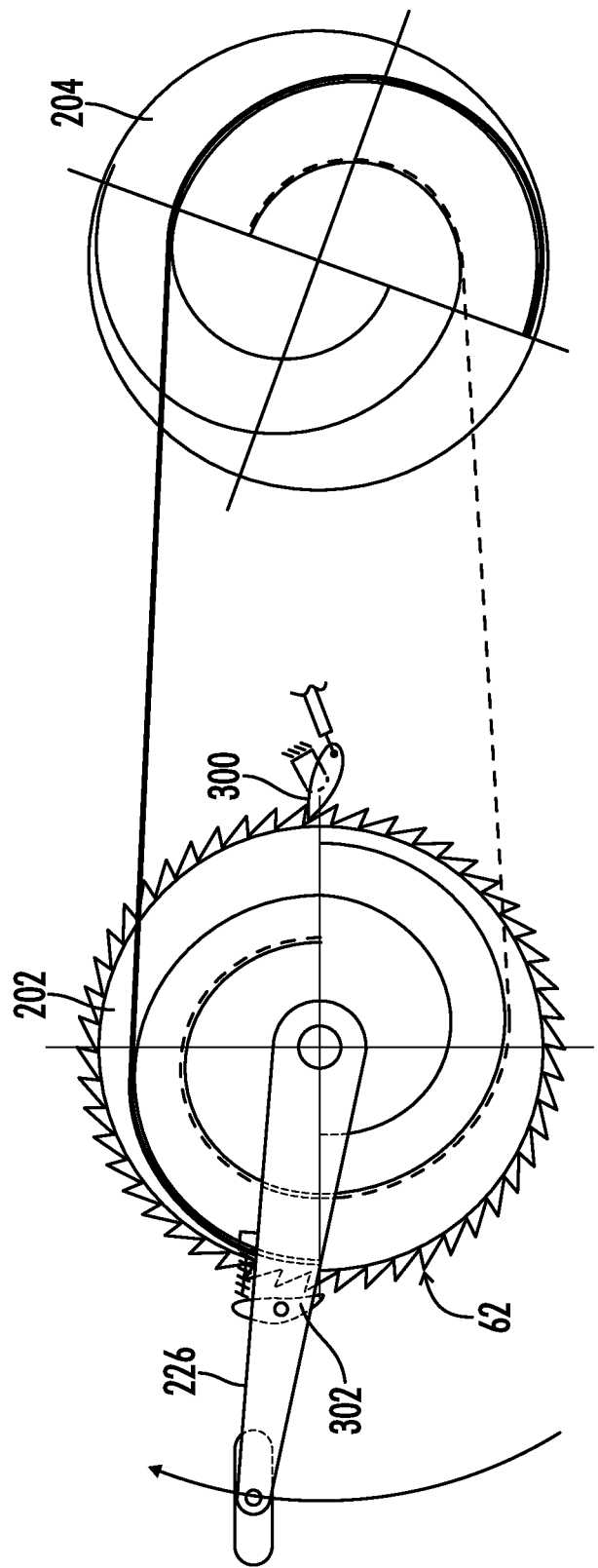
FIG. 7B illustrates left side elevation view of the embodiment of the drive system of FIG. 7A including an engaged shift lock pawl and a crank arm undergoing a return ratcheting stroke.

Referring to FIG. 7A, during some embodiments of a shifting process, a first step would be to move the crank 226 to a downward angular stop position 226'. Once the crank is positioned in the downward angular stop position 226', the shift lock pawl may be engaged, thereby locking the front spiral cone pulley 202 against counterclockwise angular rotation. Referring to FIG. 7B, in some embodiments, when the shift lock pawl 300 is engaged with the front spiral cone pulley 202, the crank 226 may be angularly moved upward relative to the front spiral cone pulley 202 in a return stroke, as seen in FIG. 7B.

After crank arm 226 is moved to an upward angular stop position at the end of a return stroke, the crank arm 226 may be pushed down in a subsequent power stroke. During the power stroke, shift lock pawl 300 may ratchet along the outer perimeter of front spiral cone pulley 202 as crank arm 226 is moved downward in the power stroke. When crank arm 226 is moved downward in a power stroke while shift lock pawl 300 is engaged, the power pawl 302 engages the pulley teeth 62 and forces the front spiral cone pulley in the counterclockwise angular direction. As such, the power stroke may be used to change the angular orientation of the front spiral cone pulley relative to the crank arm while the shift lock pawl is engaged. As the front spiral cone pulley rotates counterclockwise relative to the crank arm, the gear ratio is changed.

Rotating the front spiral cone pulley while the shift lock pawl is engaged causes the distance from the front pulley axis to the first power cable engagement point to decrease, thereby changing the drive system into a lower gear. It is noted that, in some embodiments, the crank angle 230 may be less than the maximum allowable range of rotation of the front spiral cone pulley 202. For example, in some embodiments, the crank angle 230 may be between about 170 degrees and about 10 degrees. In other embodiments, the crank angle 230 may be between about 60 degrees and about 120 degrees. In further embodiments, the front spiral cone pulley 202 may be rotated over a range of about 360 degrees while maintaining engagement of power cable 206. As such, it may be necessary to make multiple power strokes with the shift lock pawl 300 engaged to change the drive system from the highest gear ratio setting to the lowest gear ratio setting, as illustrated in FIG. 7C.

Figure 7C:
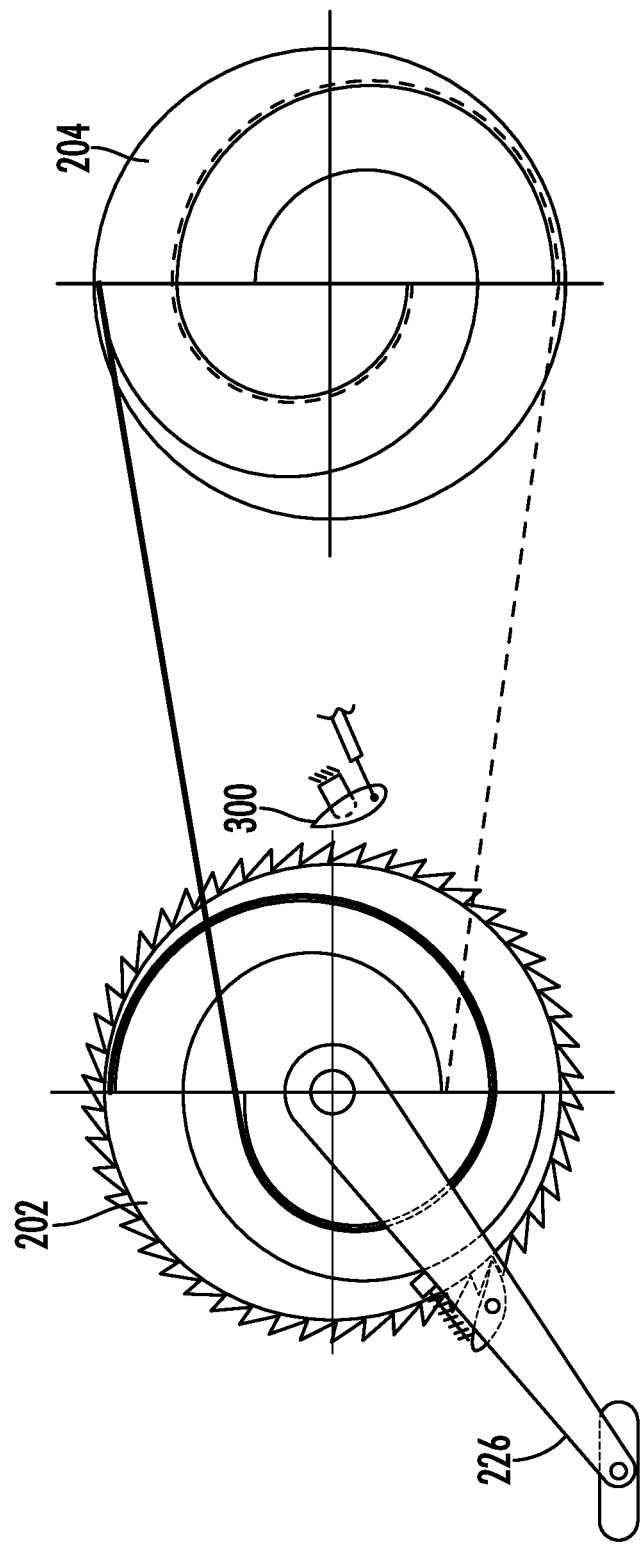
FIG. 7C illustrates the embodiment of a drive system of FIG. 7A in a low gear configuration.

As seen in FIG. 7C, when the desired gear ratio is achieved, the shift lock pawl 300 may be released and reciprocating movement of crank arm 226 may be resumed.

Dual-Sided Shifting

Figure 8:
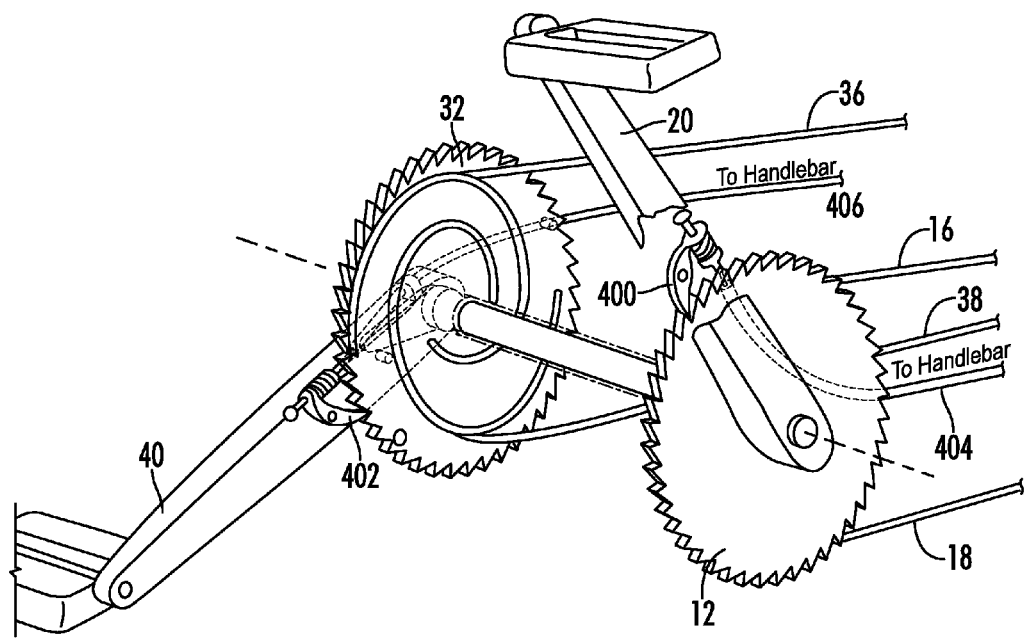
FIG. 8 illustrates a detail perspective view of an embodiment of a dual-sided drive system.

Referring now to FIG. 3, FIG. 8 and FIGS. 9A-9C, in some embodiments, a dual-sided spiral cone pulley drive system is generally illustrated. The dual-sided spiral cone pulley drive system includes a left front spiral cone pulley 12 and a right front spiral cone pulley 32. As seen in FIG. 8, in some embodiments, a shifting system for a dual-sided spiral cone pulley drive system includes a left power pawl 400 pivotally attached to the left crank arm 20. Similarly, a right power pawl 402 is pivotally attached to the right crank arm 40. Left power pawl 400 may be actuated using a left power pawl cable 404, and right power pawl 402 may be actuated using a right power pawl cable 406. In some embodiments, left power pawl cable 404 and/or left power pawl 400 is operatively attached to a left power pawl control. In some embodiments, the left power pawl control is a manual control. In other embodiments, the left power pawl control is an electronic control such as a solenoid or electronic or pneumatic actuator. Additionally, in some embodiments, right power pawl cable 406 and/or right power pawl 402 may be attached to a right power pawl control. Right power pawl control may include a manual control or an electronic control such as a solenoid or electronic actuator or pneumatic actuator in various embodiments. Left power pawl 400 may include three positions, including a locked position, a ratcheting position and a disengaged position. Similarly, right power pawl 402 may include three positions, including a locked position, a ratcheting position and a disengaged position.

Figure 9A:
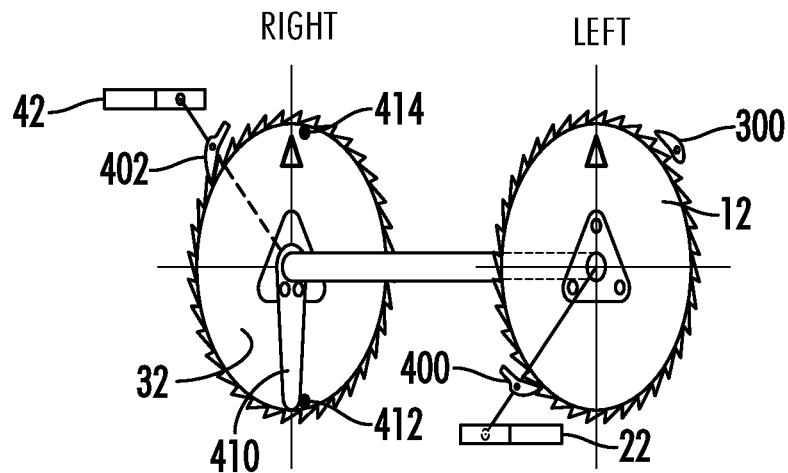
FIG. 9A illustrates a schematic perspective view of an embodiment of a dual-sided drive system following a left side power stroke.
Figure 9B:
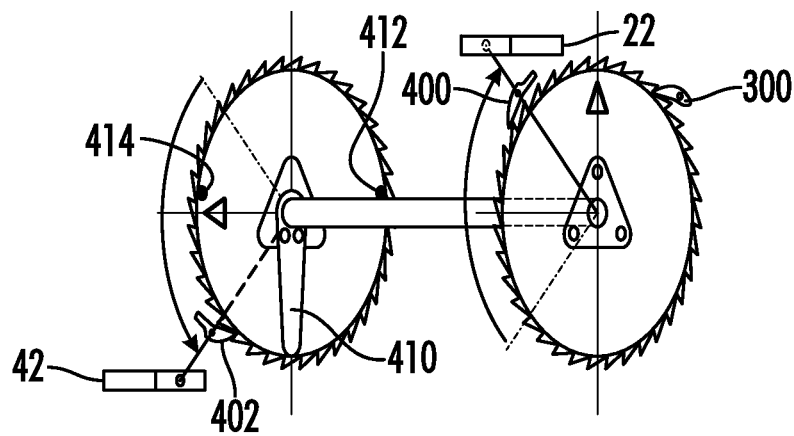
FIG. 9B illustrates a schematic perspective view of the embodiment of a dual-sided drive system of FIG. 9A following a right side power stroke.

Referring now to FIG. 9A, in some embodiments, a shifting process is initiated by depressing the left side crank arm to a downward first angular stop position 66a. At this position, a shift lock pawl that is engaged by moving the shift lock pawl toward the left front spiral cone pulley such that the shift lock pawl engages the pulley teeth, will begin downshift operation. As seen in FIG. 9B, while the shift lock pawl is engaged, the left crank arm 20 is moved upward in a return stroke, and the right crank arm 40 is moved downward in a power stroke. During this movement, because the shift lock pawl is engaged, the left power pawl will ratchet along the outer perimeter of the left spiral cone pulley, and the left spiral cone pulley will remain substantially angularly locked. When the desired amount of shifting has occurred, the return stroke can be stopped or reversed to power stroke mode to fix the gear ratio. The shift lock pawl may then be released, and normal reciprocating movement of left and right crank arms may resume.

Indexer Arm

Following shifting via angular rotation of the left front spiral cone pulley 12, it is necessary to effect a similar angular rotation in the right front spiral cone pulley. The corresponding change in angular position of the front right spiral cone pulley may be achieved using a variety of devices and methods. In some embodiments, the corresponding change in angular position of the front right spiral cone pulley is accomplished using an interference engagement between an indexer arm and one or more posts, forming a shaft interconnect that translates angular displacement of one front spiral cone pulley into angular displacement of the opposite front spiral cone pulley.

Figure 10:
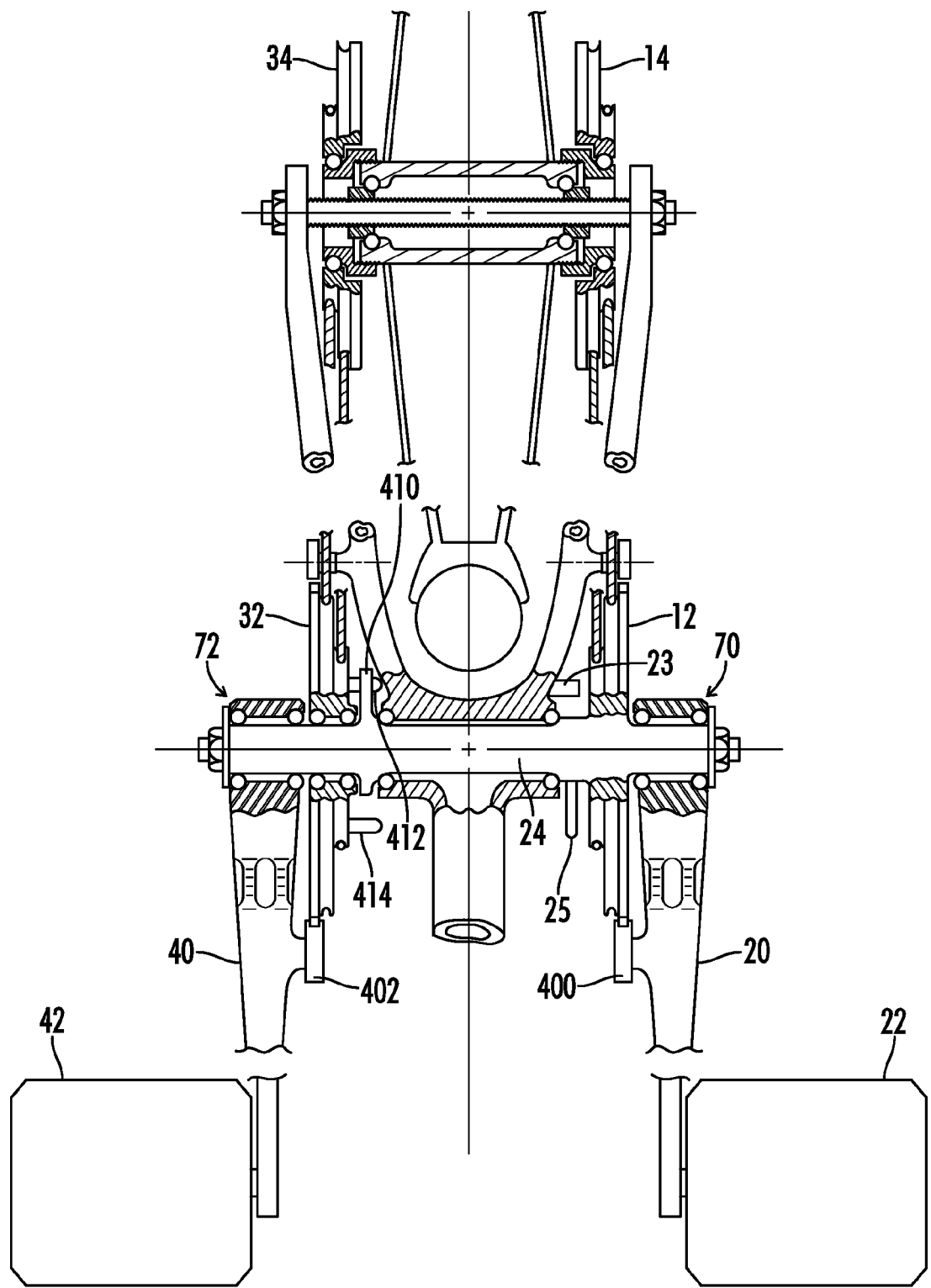
FIG. 10 illustrates a partial cross-sectional view of a bottom drive section of a bicycle in accordance with the present disclosure.

An indexer arm 410 extends from a shaft rotationally connecting first and second crank arms. The indexer arm 410 is rigidly attached through the crankshaft 24 to front left spiral cone pulley 12. When front left spiral cone pulley 12 changes angular orientation, so does indexer arm 410. In some embodiments, seen for example in FIG. 6G, indexer arm 410 forms a separate component that is slid onto crankshaft 24 and fixed in place using an indexer pin or other fastener. In other embodiments, indexer arm 410 may be integrally formed on crankshaft 24 using a one-piece construction, as seen in FIG. 10.

Right front spiral cone pulley 32 includes a first post 412 and a second post 414. In some embodiments, first and second posts 412, 414 extend axially from the inside surface of right front spiral cone pulley 32 generally toward left front spiral cone pulley 12, as seen in FIG. 10.

As seen in FIG. 6G, in some embodiments, the axially-tapered side of right front pulley 32 substantially faces toward the left front pulley 12, and the axially-tapered side of left front pulley 12 substantially faces toward the right front pulley 32. In some embodiments, the first and second posts 412, 414 extend from the side of right front pulley 32 opposite the left front pulley 12. As such, the first and second posts 412, 414 generally extend from the right front pulley 32 in a direction away from the left front pulley 12. First and second posts 412, 414 may be integrally formed on first cone body 422a in a one-piece construction. In other embodiments, first and/or second posts 412, 414 may include a modular construction and may be detachably secured to first cone body 422a as a separate piece.

First and second posts 412, 414 are positioned approximately 180 degrees apart in some embodiments such that right front spiral cone pulley 32 may rotate about 180 degrees in either angular direction before indexer arm 410 engages one of first and second posts 412, 414. As such, right front pulley 32 and left front pulley 12 are able to maintain a similar angular position following shifting on the left front pulley 12.

Figure 9C:
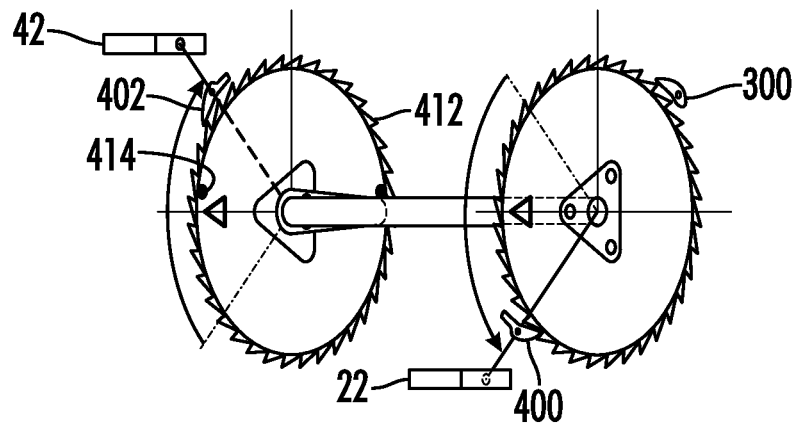
FIG. 9C illustrates a schematic perspective view of an embodiment of a dual-sided drive system following a right side power stroke and with an indexer arm engaging a travel limiting stop post.

Referring to FIG. 9C, during a power stroke of the left crank arm following release of shift lock 300, the right crank arm moves upward in a return stroke. During the return stroke of the right crank arm, the indexer arm 401 travels angularly toward first or second post 410, 412 until it engages one of the posts. When the indexer arm 401 engages a post, the angular movement of the right front spiral cone pulley stops and the right power pawl 402 ratchets along the outer perimeter of right front spiral cone pulley 32 until the right front spiral cone pulley 32 attains substantially the same angular orientation as the left front spiral cone pulley.

Front Pulley Return

Referring now to FIG. 3, in some embodiments, left and right front spiral cone pulleys 12, 32 may reach a maximum angular displacement following the shifting procedure described above. In some configurations, the maximum angular displacement corresponds to the lowest gear setting wherein the radial distances from the front pulley axis to the power cable engagement locations are at or near a minimum for the given spiral cone pulley geometry. From the position of maximum angular displacement, the right and left front spiral cone pulleys must be angularly rotated in the opposite direct to achieve a high gear setting. In some embodiments, the right and left front spiral cone pulleys may be returned to their initial angular positions by releasing both right and left power pawls simultaneously such that right and left power pawls are moved to the third mode. In such embodiments, left front pulley 12 includes a return spring 112, seen in FIG. 3. Return spring 112 may include a torsion spring attached to left front pulley 12 at one end and attached to left crank arm 20 at the opposite end. The return spring 112 is held in torsion and applies a clockwise torque to left front pulley 12. When the left power pawl is released, return spring 112 biases left front pulley 12 in the clockwise angular direction toward a high gear ratio setting in some embodiments. In various other embodiments, return spring 112 may be configured to bias front left pulley 12 in an angular direction corresponding to a low gear ratio setting.

Additionally, a second return spring may be attached to right front pulley 32 to bias right front pulley 32 in an initial angular position when right power pawl is released.

During use, a user may simultaneously release both power pawls, thereby allowing both sides of the drive system to immediately return to either a high or a low gear ratio setting.

In some embodiments, a return spring is housed in an internal cavity on either a front or a rear spiral cone pulley. For example, in some embodiments, a return spring is located in cavity 96 on a front spiral cone pulley, as seen in FIG. 6E.

Similarly, a rear return spring 114 may also be attached to one or more rear spiral cone pulleys to bias said one or more rear spiral cone pulleys at a desired angular orientation when one or more power pawls are released. For example, in some embodiments, a rear return spring 114 may be located on left rear pulley 14, as seen in FIG. 6I. The rear return spring is attached to the rear spiral cone pulley 14 at a first spring end and attaches to a fixed structure on or attached to the frame at the other end includes a torsion spring in some embodiments. In other embodiments, a return spring may include a compression spring disposed in cavity 96 or otherwise attached to a spiral cone pulley. In some embodiments, only the left rear spiral cone pulley is the only rear spiral cone pulley that includes a return spring.

End of Travel Members

Additionally, in some embodiments, one or more end of travel members may be attached to right and/or left front spiral cone pulleys 12, 32. One or more stops may be disposed on the frame for engaging a corresponding end of travel member when right and/or left rear pulley 14, 34 reaches a predetermined maximum angular displacement. Such end of travel members may prevent a power or a return cable from unwinding completely from a guide channel on a linkage guide.

Referring now to FIG. 10, in some embodiments, a crankshaft 24 extends along the bottom bracket of the frame. The crankshaft 24 may be rigidly attached to left front pulley 12. First crank arm 20 is pivotally attached to crankshaft 24 at a first crank arm joint 70, and second crank arm 40 is pivotally attached to crankshaft 24 at a second crank arm joint 72. A limit travel arm 25 extends in a generally radial direction from crankshaft 24 in some embodiments. Limit travel arm 25 may be integrally formed on crankshaft 24 as a one-piece construction in some embodiments. In other embodiments, limit travel arm 25 may be a separate piece that is detachably mounted on crankshaft 24. Limit travel arm 25 engages a corresponding limit travel stop 23 fixed to the frame. Limit travel stop 23 extends generally parallel to crankshaft 24 in some embodiments such that when crankshaft 24 is rotated about one full rotation, limit travel arm 25 engages limit travel stop 23, thereby stopping further angular rotation of crankshaft 24. As such, the engagement between limit travel stop 23 and limit travel arm 25 prevents left front pulley 12 from making more than one full rotation relative to the frame. This configuration may prevent the power cable and the return cable from unwinding completely from left front pulley 12.

Also seen in FIG. 6H, in some embodiments, a modular left front pulley 12a includes a limit travel arm 434 integrally formed on second pulley body 422b. Limit travel arm 434 engages a corresponding limit travel stop 434 extending from a fixed location. In some embodiments, the fixed location of the limit travel stop 434 is on a bicycle frame. In this configuration, modular left front pulley is not allowed to rotate more than one full rotation about the crankshaft axis.

Alternative Vehicle Embodiments

Figure 13:
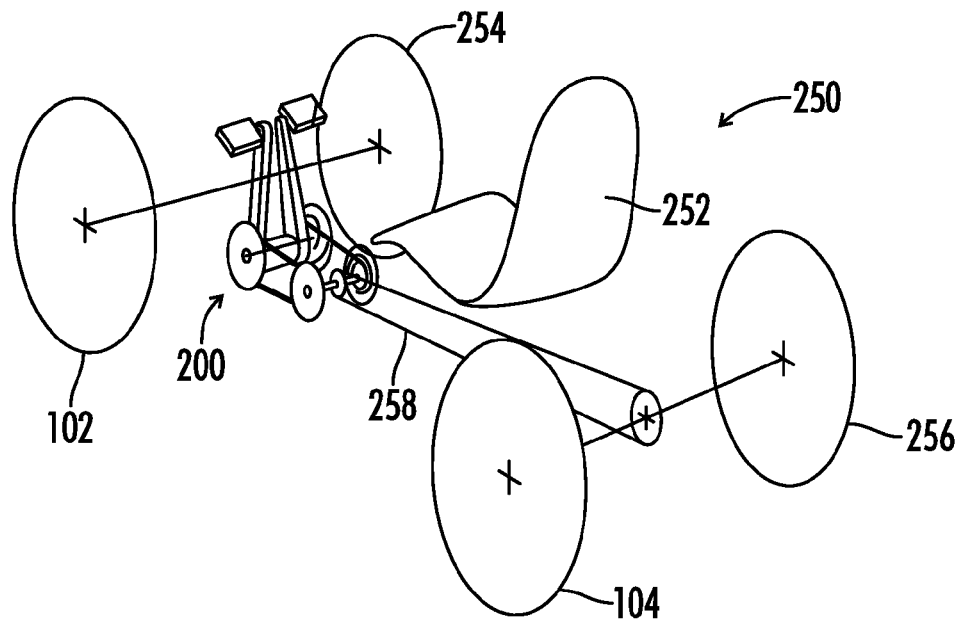
FIG. 13 illustrates an embodiment of a quadcycle having a spiral cone pulley drive system in accordance with the present disclosure.
Figure 14:
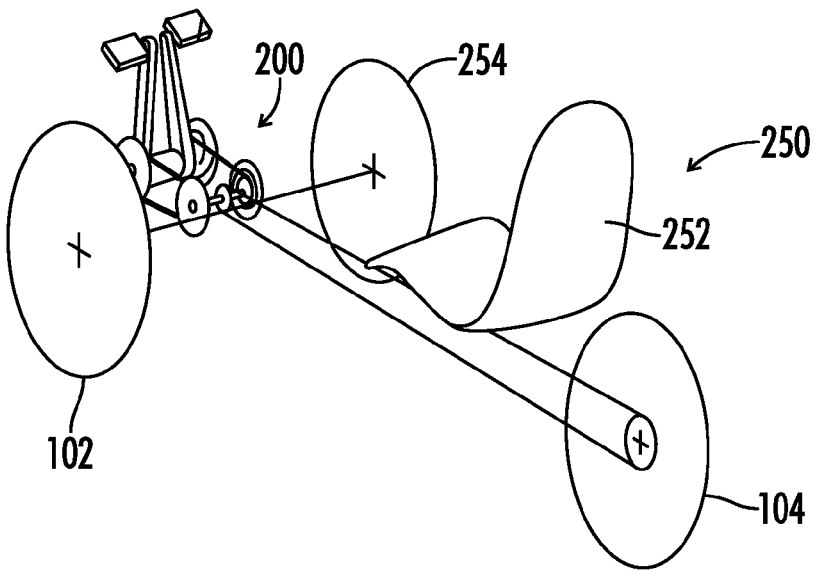
FIG. 14 illustrates an embodiment of a tricycle having a spiral cone pulley drive system in accordance with the present disclosure.
Figure 15:
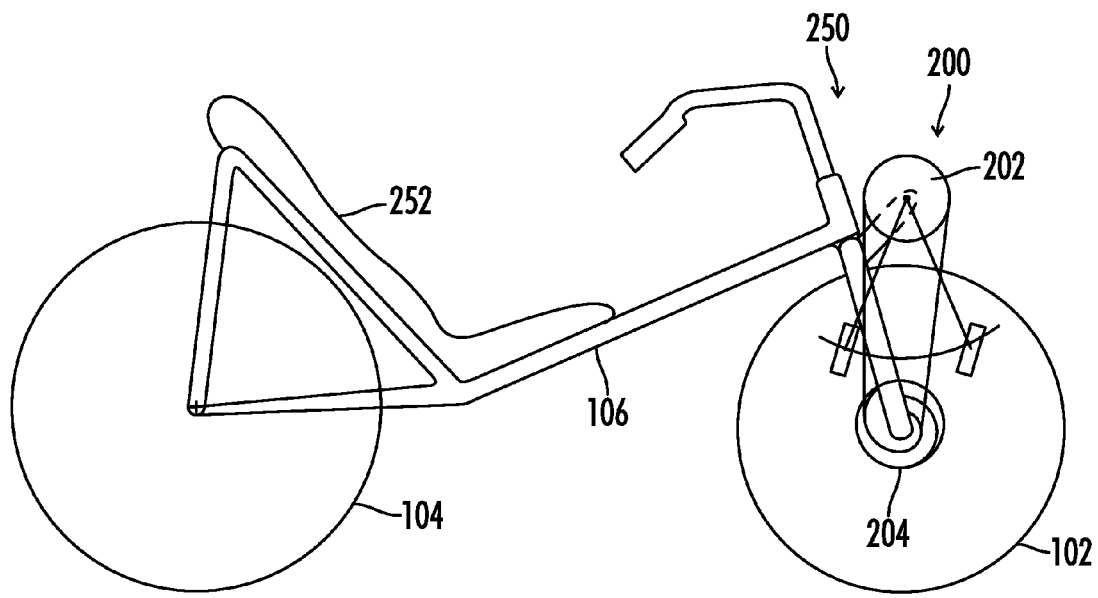
FIG. 15 illustrates an embodiment of a recumbent bicycle having a spiral cone pulley drive system in accordance with the present disclosure.
Figure 16:
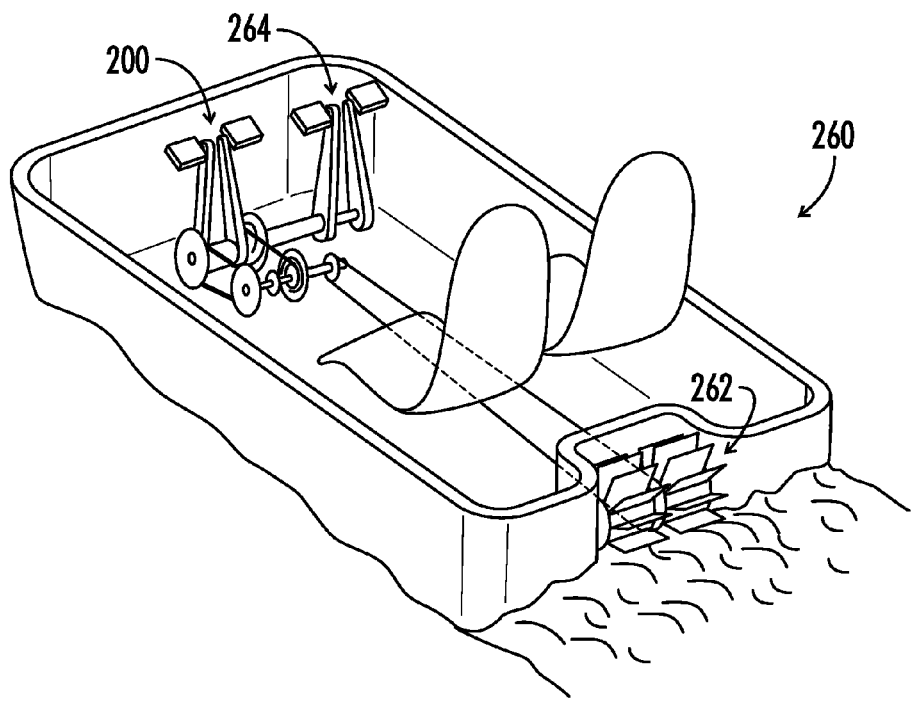
FIG. 16 illustrates an embodiment of a watercraft having a spiral cone pulley drive system in accordance with the present disclosure.

Referring now to FIGS. 13-16, in some embodiments, a drive system 200 in accordance with the present disclosure may be used in combination with alternative forms of human-powered vehicles such as recumbent bicycles, tricycles, quadcycles and watercraft. As seen in FIG. 13, a quadcycle may include a drive system 200 one or more spiral cone pulleys and including a drive linkage 258 coupled to an output shaft. Similarly, as seen in FIG. 14, a tricycle may include a drive system 200 including one or more spiral cone pulleys and a drive linkage coupled to an output shaft. Referring to FIG. 15, in some embodiments, a recumbent bicycle 250 includes a drive system 200 including a first spiral cone pulley 200 and a second spiral cone pulley 204 interconnected by a power cable and a return cable. The recumbent bicycle includes a frame 106 and a seat 252 attached to the frame. Referring to FIG. 16, a watercraft 260 includes a drive system 200 having a secondary crankset 264 coupled to a paddle 262. The drive system includes at least one spiral cone pulley and is configured to rotate the paddle 262 when the pedals are actuated in a reciprocating motion.

Thus, although there have been described particular embodiments of the present disclosure of new and useful Spiral Cone Pulley Drive System and Methods, it is not intended that such references be construed as limitations upon the scope of this disclosure except as set forth in the following claims.

What is claimed is:

1. A bicycle, comprising:
a frame;
a wheel attached to the frame;
a spiral cone pulley having an axially tapered profile attached to the bicycle, the spiral cone pulley including a pulley axis of rotation, the spiral cone pulley including the shape of a disk having a first pulley side and a second pulley side, the first pulley side including the axially tapered profile;
a first linkage guide disposed on the first pulley side, the first linkage guide forming a first guide channel, the first linkage guide advancing radially toward the pulley axis of rotation along the axially tapered profile of the first pulley side in the axial direction away from the second pulley side;
a first tension linkage disposed on the spiral cone pulley, wherein the first tension linkage is received in the first guide channel; and
a second linkage guide disposed on the first pulley side, wherein the second linkage guide includes a second guide channel,
wherein the wheel is configured to turn when the first tension linkage is pulled in a direction away from the wheel.

2. The bicycle of claim 1, wherein:
the first tension linkage comprises a cable.

3. The bicycle of claim 1, wherein:
the second linkage guide advances radially toward the pulley axis of rotation along the axially tapered profile of the first pulley side in the axial direction away from the second pulley side.

4. A drive system for a human-powered vehicle, comprising:
a frame;
a first front spiral cone pulley attached to the frame;
a first rear spiral cone pulley;
a first tension linkage extending between the first front spiral cone pulley and the first rear spiral cone pulley;
a second front spiral cone pulley attached to the frame;
a second rear spiral cone pulley; and
a second tension linkage extending between the second front spiral cone pulley and the second rear spiral cone pulley.

5. The drive system of claim 4, further comprising:
a shift lock pawl pivotally attached to the frame.

6. The drive system of claim 5, further comprising:
a crank arm pivotally attached to the frame, wherein the crank arm is angularly moveable relative to the first front spiral cone pulley.

7. The drive system of claim 6, further comprising:
a power pawl pivotally attached to the crank arm.

8. The drive system of claim 7, further comprising:
a plurality of pulley teeth disposed on an outer edge of the first front spiral cone pulley,
wherein the power pawl is configured to selectively engage the plurality of pulley teeth in a ratcheting action.

9. The drive system of claim 4, further comprising:
the first front spiral cone pulley including a first axially-tapered side;
the second front spiral cone pulley including a second axially-tapered side;
the first rear spiral cone pulley including a third axially-tapered side; and
the second rear spiral cone pulley including a fourth axially-tapered side,
wherein the first and second axially-tapered sides face generally toward the frame and the first and second rear spiral cone pulleys face generally away from the frame.

10. The drive system of claim 9, further comprising:
a first crank arm attached to the first front spiral cone pulley;
a second crank arm attached to the second front spiral cone pulley;
a rocker attached to the frame;
a first rocker arm pivotally attached to the rocker and to the first crank arm; and
a second rocker arm pivotally attached to the rocker and to the second crank arm.

11. The drive system of claim 10, wherein:
the first and second rocker arms are rigid.

12. The drive system of claim 4, further comprising:
a spiral guide channel defined in the first front spiral cone pulley, wherein the spiral guide channel forms at least a 180 degree spiral of decreasing radius relative to an axis of rotation of the first front spiral cone pulley.

* * * * *